US012757085B2

(12) United States Patent
Cui et al.

(10) Patent No.: US 12,757,085 B2
(45) Date of Patent: Oct. 6, 2026

(54) CELL DETECTION AND MEASUREMENT FOR REDUCED CAPABILITY UE WITH eDRX IN IDLE AND INACTIVE MODE

(71) Applicant: APPLE INC., Cupertino, CA (US)

(72) Inventors: Jie Cui, San Jose, CA (US); Dawei Zhang, Saratoga, CA (US); Hong He, San Jose, CA (US); Huaning Niu, San Jose, CA (US); Manasa Raghavan, Sunnyvale, CA (US); Qiming Li, Beijing (CN); Xiang Chen, Campbell, CA (US); Yang Tang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 273 days.

(21) Appl. No.: 18/698,053

(22) PCT Filed: Oct. 22, 2021

(86) PCT No.: PCT/CN2021/125735

§ 371 (c)(1),
(2) Date: Apr. 3, 2024

(87) PCT Pub. No.: WO2023/065307

PCT Pub. Date: Apr. 27, 2023

(65) Prior Publication Data

US 2024/0406818 A1 Dec. 5, 2024

(51) Int. Cl.

*H04W 36/00* (2009.01)
*H04W 76/28* (2018.01)

(52) U.S. Cl.

CPC ....... *H04W 36/0085* (2018.08); *H04W 76/28* (2018.02)

(58) Field of Classification Search

CPC .......................... H04W 36/0085; H04W 76/28
See application file for complete search history.

(56) References Cited

U.S. PATENT DOCUMENTS

| | | | | |
|---|---|---|---|---|
| 2017/0094713 A1 | 3/2017 | Su et al. | | |
| 2019/0069192 A1* | 2/2019 | Palenius | ............... | H04W 24/10 |

(Continued)

FOREIGN PATENT DOCUMENTS

| | | |
|---|---|---|
| CN | 112385255 A | 2/2021 |
| CN | 112567775 A | 3/2021 |
| WO | 2017134561 A1 | 8/2017 |

OTHER PUBLICATIONS

3GPP TR 38.875, "3rd Generation Partnership Project; Technical Specification Group Radio Access Network; Study on support of reduced capability NR devices (Release 17)", V1.1.0, Mar. 2021, 135 pages.

(Continued)

*Primary Examiner* — Raymond S Dean
(74) *Attorney, Agent, or Firm* — Dorsey & Whitney LLP

(57) ABSTRACT

Serving cell measurements at a reduced capability UE in idle mode in FR1 includes identifying an eDRX cycle length associated with the reduced capability UE is longer than or equal to 20.48 s and shorter than or equal to 10, 485.76 s. The eDRX cycle length includes a DRX cycle length. A measurement period associated with a serving cell of the reduced capability UE is determined to occur within a single PTW of the eDRX cycle. The measurement period includes measurement samples to be performed within the single PTW. A length of the single PTW is determined based on a product of the DRX cycle length and a sample scaling factor associated with the measurement samples. The length of the single PTW comprises a multiple of 1.28. Serving cell measurements are performed during the single PTW. The serving cell measurements include each of the measurement samples associated with the measurement period.

18 Claims, 14 Drawing Sheets

(56) References Cited

U.S. PATENT DOCUMENTS

| | | | | |
|---|---|---|---|---|
| 2019/0069235 | A1* | 2/2019 | Patil | H04W 52/0216 |
| 2019/0297570 | A1* | 9/2019 | Bharadwaj | H04W 52/0209 |
| 2019/0320490 | A1* | 10/2019 | Liu | H04W 52/0216 |
| 2021/0184812 | A1* | 6/2021 | MolavianJazi | H04L 1/0041 |
| 2021/0243613 | A1* | 8/2021 | Khanfouci | H04L 41/0895 |
| 2021/0274465 | A1 | 9/2021 | Huang et al. | |
| 2021/0314785 | A1 | 10/2021 | Raghavan et al. | |
| 2023/0016327 | A1* | 1/2023 | Long | H04W 76/28 |

OTHER PUBLICATIONS

Huawei, Hisilicon, "Discussion on Extended DRX enhancements for RedCap UE", R4-2113848, 3GPP TSG-RAN WG4 Meeting# 100-e, Electronic Meeting, Agenda Item 9.20.3.3, Aug. 16-27, 2021, 4 pages.

Moderator (Vivo), "Email discussion summary for [1 00-e][235] NR_redcap_RRM_2", R4-2105410, 3GPP TSG-RAN WG4 Meeting # 100-e, Electronic Meeting, Agenda Item 9.20.3.3 & 9.20.3.4, Aug. 16-27, 2021, 77 pages.

Qualcomm Incorporated , "eDRX enhancements for Reduced Capability UE", R4-2114574, 3GPP TSG-RAN WG4 Meeting #100-e, Online, Agenda Item 9.20.3.3, Aug. 16-27, 2021, 6 pages.

PCT/CN2021/125735, International Search Report and Written Opinion, Jul. 18, 2022, 9 pages.

* cited by examiner

CELL DETECTION AND MEASUREMENT FOR REDUCED CAPABILITY UE WITH eDRX IN IDLE AND INACTIVE MODE

TECHNICAL FIELD

This application relates generally to wireless communication systems, including serving cell measurements related to reduced capability user equipments (UEs).

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

Frequency bands for 5G NR may be separated into two or more different frequency ranges. For example, Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
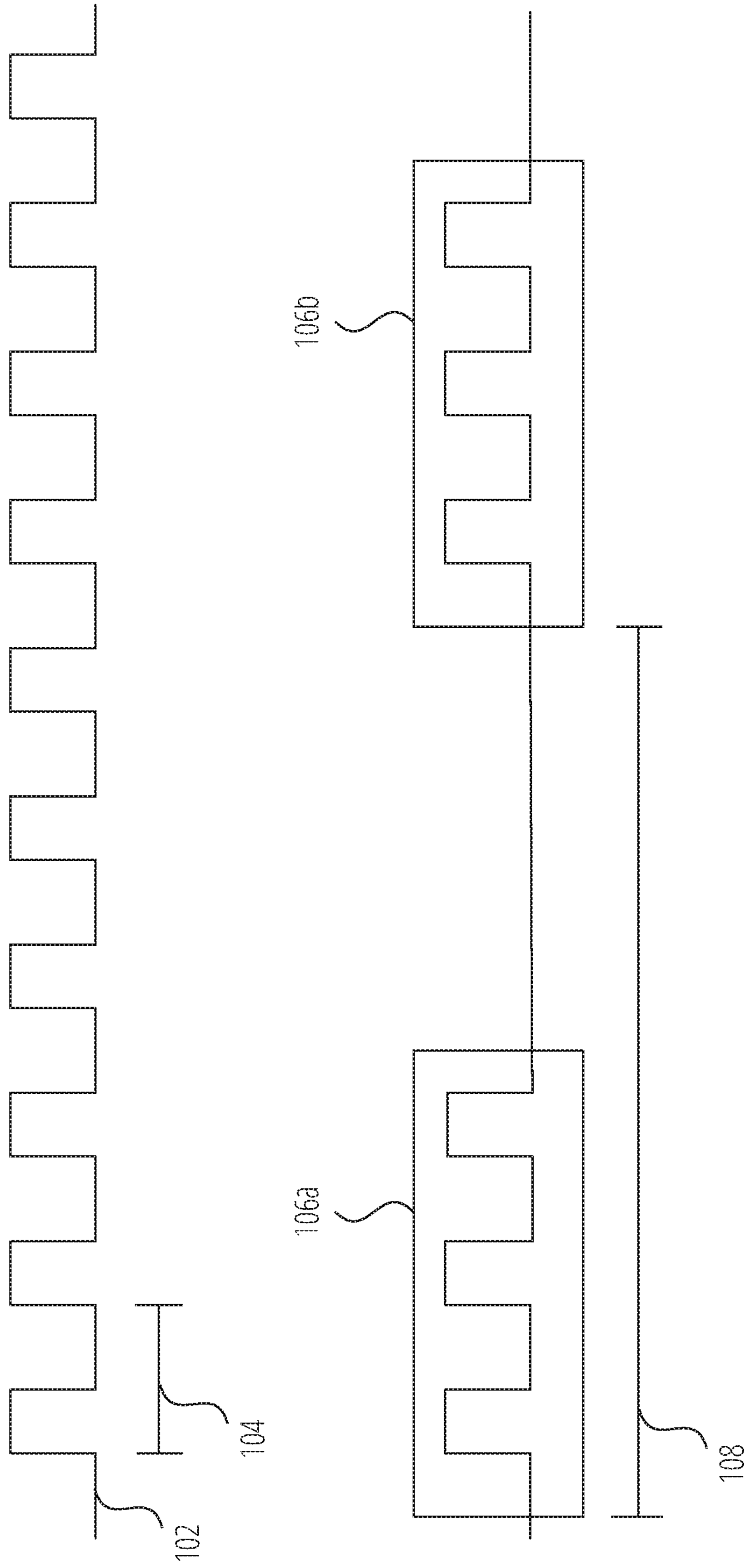
FIG. 1 illustrates an aspect of the subject matter in accordance with one embodiment.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

By way of background, some agreements have been reached regarding radio resource management (RRM) measurement with extended discontinuous reception (eDRX) in IDLE and inactive modes (see WF R4-2115364). However, a number of issues are still to be resolved. For instance, as part of such agreements, the following may apply: 1. With respect to prioritizing the eDRX requirements for FR1 and de-prioritizing the eDRX requirements for FR2, eDRX requirements for FR1 may be defined while whether eDRX requirements for FR2 are to be defined is yet to be determined; 2. Design principles of LTE eDRX requirements include the following open issues: a. Whether to use LTE eDRX requirements as a baseline when developing NR eDRX requirements; b. For 10.24 second(s)<eDRX_cycle_length≤2621.44 s, whether to use the LTE RRM requirement of UE categories other than Cat-M/Cat-NB in IDLE mode as a baseline to define RRM requirements for reduced capacity (RedCap) (e.g., wearables, Internet of Things (IoT) devices, and so forth). UEs in IDLE and INACTIVE mode, and for 2621.44 s<eDRX_cycle_length≤10485.76 s, the applicable RRM requirements for RedCap UEs in IDLE and INACTIVE mode are to be determined; and c. To be determined eDRX enhancements in RAN4 after final determinations on eDRX configurations in RAN2; 3. How to determine paging time window (PTW) length, including using the same PTW lengths as LTE (i.e., for eDRX) as a baseline for eDRX cycle lengths greater than 10.24 s and potential use of scaling factors; and 4. Assumptions on measurements in eDRX with PTW are still to be determined, including: a. Whether the assumption that all measurements are performed within PTW of an eDRX cycle in LTE can still be reused for NR when eDRX is configured for Redcap; and b. Whether, when eDRX is used, the number of samples for Nserv in 5G NR (measured in DRX cycles) has to be performed in a single PTW.

The following issues are also yet to be determined: 1. With respect to serving cell measurements with eDRX: a. How to implement the PTW at UE/network for FR1 and/or FR2 (e.g., PTW length, number of PTWs, and so forth); and 2. With respect to neighbor cell detection and measurements with eDRX: a. How to implement intra-frequency and inter-frequency cases; b. How to implement cell detection, measurement, and evaluation; and c. How to implement the PTW at UE/network for FR1 and/or FR2 (e.g., PTW length, number of PTWs, and so forth). Accordingly, the principles described herein relate to such issues regarding PTWs, serving cell measurements with eDRX, and neighbor cell detection/measurements with eDRX.

FIG. 1 illustrates some example background information regarding DRX, eDRX, and PTWs. As shown, FIG. 1 includes DRX cycle timeline 102, which includes a number of DRX cycles (as partially represented by DRX cycle 104), each of which have an active portion (i.e., the high portion of each DRX cycle) and an inactive portion (i.e., the low portion of each DRX cycle). During the active portion, for example, a UE may send/receive information with respect to a base station. Accordingly, DRX may be utilized by a UE to sleep during the inactive portions and wake up during the active portions such that the UE can conserve resources.

As illustrated, FIG. 1 also includes eDRX cycle 108 which includes a PTW 106*a*. Such eDRX cycles may allow UEs to sleep for even longer periods of time (in comparison to DRX), which may be particularly useful for reduced capability UEs (e.g., wearables). As illustrated, the eDRX cycle 108 may begin at a starting point of a first PTW (e.g., PTW 106*a*) and end at the beginning of a second PTW (e.g., PTW 106*b*), which may comprise the beginning of another eDRX cycle. Notably, the PTW may include the portions of the waveform associated with a same timeframe of the DRX cycle timeline 102, which may allow the UE to wake up for such time periods (i.e., during a given PTW). As shown, however, the DRX cycles outside of the PTW of an eDRX cycle may be ignored such that the UE can sleep during those periods. In this way, UEs (and networks) can better conserve resources. In addition, DRX cycles, eDRX cycles, and PTWs may be flexible as to time durations such that the DRX cycles, eDRX cycles, and the PTWs can be better utilized in any given network situation.

Initially, with respect to the principles and solutions provided herein, serving cell measurements with eDRX for RedCap UEs in FR1, the minimum PTW length may be 1.28 s while the step length/granularity of PTW length may be 1.28 (i.e., the PTW length has to be divisible by 1.28) when an IDLE eDRX cycle is longer than 10.24 s. In addition, in FR1 with eDRX, RedCap UEs and corresponding networks may assume that the serving cell measurement period (with N samples, where N=M*DRX_cycle samples) is included within a single PTW window (i.e., all samples have to be measured within a single PTW) when eDRX>10.24 s for IDLE mode, with the following two options: 1. The serving cell measurement period may comprise an M*DRX cycle period when 20.48 s<=eDRX<=10485.76 s for IDLE mode. The value M, which is related to a number of samples, may comprise any positive integer, but is shown for exemplary purposes only as being M<=2 in Table 1 below; or 2. The serving cell measurement period may comprise an M*DRX cycle period (e.g., M<=2) when 20.48 s<eDRX<=10485.76 s for IDLE mode, wherein if a synchronization signal block (SSB) based measurement timing configuration (SMTC) periodicity (TSMTC)>20 ms and a DRX cycle<=0.64 s, the serving cell measurement period may comprise k*M*DRX cycle period, where k is a scaling factor related to cases having an SMTC periodicity >20 ms and a DRX cycle≤0.64 s.

Table 2 below illustrates such an embodiment where M<=2 and k=2. M and k, however, may comprise any applicable value as the values of M and k in Table 2 are for exemplary purposes only. Notably, Table 2 (as well as many other Tables within this disclosure) includes a ceiling function which may be used to ensure that a given PTW length is a multiple of (or divisible by) 1.28. In particular, the calculated length of a PTW may comprise a number that is not divisible by 1.28 (e.g., a PTW having three DRX cycles of 64 s). In such cases, the calculated number may be divided by 1.28 and the resulting number may be rounded up to a nearest integer that is larger than the calculated number (i.e., a ceiling function). The nearest integer may then be multiplied by 1.28 and the resulting value may be used as the PTW length, thus ensuring divisibility by 1.28 of the PTW length. In an example, assume a PTW includes five DRX cycles of 0.64 seconds, which is equal to 3.2, a number that is not divisible by 1.28. Accordingly, after dividing 3.2 by 1.28, the resulting value is 2.5. 2.5 may then be rounded up to the nearest integer that is larger than 2.5, 3. 3 may then be multiplied by 1.28, resulting in a PTW length of 3.84 s (which is divisible by 1.28 and able to include the 3.2 seconds of DRX cycles within the PTW).

TABLE 1

| eDRX cycle length[s] | DRX cycle length[s] | PTW length[s] (number of 1.28 s periods) | Nserv [number of DRX cycles] |
|---|---|---|---|
| 20.48 ≤ eDRX_IDLE cycle length ≤ 10485.76 | 0.32 | ≥1.28 (1) | M |
| | 0.64 | ≥1.28 (1) | M |
| | 1.28 | ≥2.56 (2) or ≥ M*1.28 (M) | M |
| | 2.56 | ≥5.12 (4) or ≥ M*2.56 (2M) | M |

TABLE 2

| eDRX cycle length[s] | DRX cycle length[s] | PTW length[s] (number of 1.28 s periods) | Nserv [number of DRX cycles] |
|---|---|---|---|
| 20.48 ≤ eDRX_IDLE cycle length ≤ 10485.76 | 0.32 | ≥1.28 (1) or ceiling(k * M * 0.32/1.28)*1.28 s | k*M |
| | 0.64 | ≥1.28 (1) or ceiling(k * M * 0.64/1.28)*1.28 s | k*M |
| | 1.28 | ≥2.56 (2) or ≥ M*1.28 (M) | M |
| | 2.56 | ≥5.12 (4) or ≥ M*2.56 (2M) | M |

In contrast, with respect to serving cell measurements with eDRX for RedCap UEs in FR1, the serving cell measurement period (with N samples) may comprise an M*eDRX cycle period (e.g., M<=2) when 2.56 s<=eDRX<=10.24 s for IDLE mode and Inactive mode. This embodiment is demonstrated in Table 3 below.

TABLE 3

| eDRX cycle length[s] | Nserv [number of eDRX cycles] |
|---|---|
| 2.56 | M |
| 5.12 | M |
| 10.24 | M |

Serving cell measurements with eDRX for RedCap UEs in FR2 may include various options and sub-options. For instance, in a first option, the serving cell measurement period (with N samples) may comprise a single PTW window when eDRX>10.24 s for IDLE mode. Notably, the measurement period in FR2 may include physical layer/layer 1 (PHY/L1) filtering samples and beam sweeping for measurements. The first option may further include various sub-options as follows: a. The serving cell measurement period may comprise an X1 (or X2, X3, or X4)*M*DRX cycle period when 20.48 s<=eDRX<=10485.76 s for IDLE mode, where X1, X2, X3, and X4 each comprise scaling factors for beam sweeping and are each less than or equal to 8 (e.g., X1, X2, X3, and/or X4=3). In particular, M may be related to a number of samples for performing a PHY average based on one Rx beam (i.e., a physical layer filtering factor) and each X (i.e., X1, X2, X3, and X4) is related to a number of beams used for beam sweeping, where X*M (i.e., a number of samples) is to be completed within a single PTW. Option 1a is demonstrated in Table 4 below with an M value<=2 for exemplary purposes, as M may comprise any applicable value; or b. The serving cell measurement period may comprise an X1 (or X2, X3, or X4)*M*DRX cycle period when 20.48 s<=eDRX<=10485.76 s for IDLE mode, where again X1, X2, X3, and X4 each comprise scaling factors for beam sweeping and are each less than or equal to 8 (e.g., X1, X2, X3, and/or X4=3), wherein if a TSMTC>20 ms and a DRX cycle<=0.64 s, the serving cell measurement period may comprise k*X1 (or X2, X3, or X4)*M*DRX cycle period (where X1, X2, X3, and X4 each comprise scaling factors for beam sweeping and are each less than or equal to 8—e.g., X1, X2, X3, and/or X4=3). Again, k may comprise a scaling factor related to cases having an SMTC periodicity>20 ms and a DRX cycle≤0.64 s. Option 1b is demonstrated in Table 5 below with M<=2 and k=2 for exemplary purposes, as M and k may comprise any applicable value. Notably for both option 1a and option 1b, X1, X2, X3, and/or X4 may comprise a same value (e.g., X1=X2=X3=X4) or different values (i.e., one or more of X1, X2, X3, and/or X4 may comprise different values in comparison to each other). In addition, both options above (and their corresponding Tables, Table 4 and Table 5) may include use of a ceiling function, as described above, when a calculated PTW length is not divisible by 1.28. Finally, both cases may also allow for determining samples via M and X1 (X2, X3, or X4).

TABLE 4

| eDRX cycle length[s] | DRX cycle length[s] | PTW length[s] (number of 1.28 s periods) | Nserv [number of DRX cycles] |
|---|---|---|---|
| 20.48 ≤ eDRX_IDLE cycle length ≤ 10485.76 | 0.32 | ≥ceiling(X1 * M * 0.32/1.28)*1.28 s | X1*M |
| | 0.64 | ≥ceiling(X2 * M * 0.64/1.28)*1.28 s | X2*M |
| | 1.28 | ≥ceiling(X3 * M * 1.28/1.28)*1.28 s | X3*M |
| | 2.56 | ≥ceiling(X4 * M * 2.56/1.28)*1.28 s | X4*M |

TABLE 5

| eDRX cycle length[s] | DRX cycle length[s] | PTW length[s] (number of 1.28 s periods) | Nserv [number of DRX cycles] |
|---|---|---|---|
| 20.48 ≤ eDRX_IDLE cycle length ≤ 10485.76 | 0.32 | ≥ceiling(k*X1 * M * 0.32/1.28)*1.28 s | k*X1*M |
| | 0.64 | ≥ceiling(k*X2 * M * 0.64/1.28)*1.28 s | k*X2*M |
| | 1.28 | ≥ceiling(X3 * M * 1.28/1.28)*1.28 s | X3*M |
| | 2.56 | ≥ceiling(X4 * M * 2.56/1.28)*1.28 s | X4*M |

A second option related to serving cell measurements with eDRX for RedCap UEs in FR2 may include the serving cell measurement period (with N samples and without beam sweeping) comprising a single PTW window when eDRX>10.24 s for IDLE mode. In other words, such a single PTW may only include PHY/L1 filtering samples based on one or some reception (Rx) beams while not including measurement samples associated with other Rx beams (i.e., full beam sweeping is not included). Notably, however, all samples for any given Rx beam have to be included within a single PTW. Accordingly, assuming M samples are used for measurement with one Rx beam and the UE Rx beam scaling factor is X1, X2, X3, and X4, the PTW may comprise a period smaller than M*X1 (or X2, X3, or X4), which would be used in the case of full beam sweeping. Such embodiments (i.e., the second option) may include various sub-options, as follows: a. The serving cell measurement period may comprise a Y1 (or Y2, Y3, or Y4)*M*DRX cycle period when 20.48 s<=eDRX<=10485.76 s for IDLE mode, where Y1, Y2, Y3, and Y4<X1, X2, X3, and X4 (i.e., Y1<X1, Y2<X2, Y3<X3, and Y4<X4). Again, X1, X2, X3, and X4 comprise scaling factors for beam sweeping and X1, X2, X3, and X4<=8 (e.g., X1, X2, X3, and X4=3). Option 2a is demonstrated in Table 6 below with an M value<=2 for exemplary purposes, as M may comprise any applicable value; or b. The serving cell measurement period may comprise a Y1 (or Y2, Y3, or Y4)*M*DRX cycle period when 20.48 s<=eDRX<=10485.76 s for IDLE mode, wherein if SMTC periodicity (TSMTC)>20 ms and DRX cycle<=0.64 s, the serving cell measurement period may comprise a k*Y1/2/3/4*M*DRX cycle period. Again Y1, Y2, Y3, and Y4<X1, X2, X3, and X4 (i.e., Y1<X1, Y2<X2, Y3<X3, and Y4<X4), and X1, X2, X3, and X4 comprise scaling factors for beam sweeping in addition to each comprising a value less than or equal to 8 (e.g., X1, X2, X3, and X4=3). Option 2b is demonstrated in Table 7 below with M<=2 and k=2 for exemplary purposes, as M and k may comprise any applicable value. Notably, for both option 2a and option 2b, X1, X2, X3, and/or X4 may comprise a same value (i.e., X1=X2=X3=X4) or different values (i.e., one or more of X1, X2, X3, and/or X4 may comprise different values in comparison to each other). Similarly, for both option 2a and option 2b, Y1, Y2, Y3, and/or Y4 may comprise a same value (i.e., Y1=Y2=Y3=Y4) or different values (i.e., one or more of Y1, Y2, Y3, and/or Y4 may comprise different values in comparison to each other). In addition, both options 2a and 2b above (and their corresponding Tables, Table 6 and Table 7) may include use of a ceiling function, as described above, when a calculated PTW length is not divisible by 1.28.

TABLE 6

| eDRX cycle length[s] | DRX cycle length[s] | PTW length[s] (number of 1.28 s periods) | Nserv [number of DRX cycles] |
|---|---|---|---|
| 20.48 ≤ eDRX_IDLE cycle length ≤ 10485.76 | 0.32 | ≥ceiling(Y1 * M * 0.32/1.28)*1.28 s | Y1*M |
| | 0.64 | ≥ceiling(Y2 * M * 0.64/1.28)*1.28 s | Y2*M |
| | 1.28 | ≥ceiling(Y3 * M * 1.28/1.28)*1.28 s | Y3*M |
| | 2.56 | ≥ceiling(Y4 * M * 2.56/1.28)*1.28 s | Y4*M |

TABLE 7

| eDRX cycle length[s] | DRX cycle length[s] | PTW length[s] (number of 1.28 s periods) | Nserv [number of DRX cycles |
|---|---|---|---|
| 20.48 ≤ eDRX_IDLE cycle length ≤ 10485.76 | 0.32 | ≥ceiling(k*Y1 * M* 0.32/1.28)*1.28 s | k*Y1*M |
| | 0.64 | ≥ceiling(k*Y2 * M * 0.64/1.28)*1.28 s | k*Y2*M |
| | 1.28 | ≥ceiling(Y3 * M * 1.28/1.28)*1.28 s | Y3*M |
| | 2.56 | ≥ceiling(Y4 * M * 2.56/1.28)*1.28 s | Y4*M |

In contrast, with respect to serving cell measurements with eDRX for RedCap UEs in FR2, the serving cell measurement period (with N samples) may comprise an X5 (or X6 or X7)*M*DRX cycle period when 2.56 s<=eDRX<=10.24 s for IDLE mode and inactive mode. X5, X6, and X7 comprise a scaling factor for beam sweeping, where X5, X6, and X7<3 (e.g., X5, X6, and X7=3) may comprise a same value (i.e., X5=X6=X7 or different values (i.e., one or more of X5, X6, and/or X7 may comprise different values in comparison to each other). This embodiment is demonstrated in Table 8 below.

TABLE 8

| eDRX cycle length[s] | Nserv [number of eDRX cycles] |
|---|---|
| 2.56 | X5*M |
| 5.12 | X6*M |
| 10.24 | X7*M |

With respect to intra-frequency and inter-frequency cell measurements with eDRX for RedCap UE in FR1, the minimum PTW length may be 1.28 s in addition to a step length/granularity of PTW length being 1.28 (i.e., the PTW length has to be divisible by 1.28) when an IDLE mode eDRX cycle is longer than 10.24 s. For intra-frequency/inter-frequency cell detection/measurement/evaluation with respect to RedCap UEs in FR1 with eDRX, when eDRX>10.24 s for IDLE mode, the following may apply: 1. RedCap UEs and networks can assume that the intra-frequency/inter-frequency cell measurement period may comprise a single PTW window; 2. RedCap UEs and networks can assume that the intra-frequency/inter-frequency cell evaluation period may comprise a single PTW window. However, a given intra-frequency/inter-frequency cell measurement period and a given intra-frequency/inter-frequency cell evaluation period can be in a same PTW (i.e., such cell measurement periods and cell evaluation periods may occur with a single PTW) or different PTW windows (e.g., a given cell measurement period may occur during a first PTW and a given cell evaluation period may occur in a second, different PTW).

As such, PTW design may be based on a function, max {intra-frequency/inter-frequency cell measurement period, intra-frequency/inter-frequency cell evaluation period} to ensure that a length of such PTWs (i.e., each such PTW may be the same length) is large enough to allow the longer of the cell measurement period and the cell evaluation period to be performed entirely. The following function associated with the PTW length may also apply to ensure that the PTW length is both a multiple of 1.28 and large enough to accommodate at least the larger of the cell measurement period and the cell evaluation period (i.e., via use of a ceiling function): PTW>=ceiling (max {M1, M2}*DRX_cycle/1.28)*1.28, where M1 is a DRX number for cell measurement (i.e., measurement samples) and M2 is a DRX number for cell evaluation (i.e., evaluation samples).

In addition, with respect to intra-frequency/inter-frequency cell detection period and PTW window design (for RedCap UEs with eDRX in FR1), the following options may apply: 1. RedCap UEs and networks can assume that the intra-frequency/inter-frequency cell detection period may comprise a single PTW window; or 2. RedCap UEs and networks can assume that the intra-frequency/inter-frequency cell detection period can be split between multiple PTWs. In such embodiments (i.e., option 2), the number of PTW windows used for detection may comprise: ceiling (M3/ceiling (PTW length/DRX_cycle length)), where M3 is the DRX number for cell detection (i.e., M3 can be a number of detection samples).

In particular, by first dividing the PTW length by the DRX cycle length (then rounding up to the nearest larger integer), it can be determined how many DRX cycles are within a given PTW (i.e., DRX cycles per PTW). The resulting value of the DRX per PTW can then be divided by the number of detection samples (i.e., M3) and rounded up to the nearest larger integer to determine the total number of PTWs to ensure performance of all of the detection samples. The total number of PTWs can then be used to determine the number eDRX cycles to be utilized (i.e., the total number of PTWs is equal to the total number of eDRX cycles). Notably, the PTW length here can be determined similarly to other examples described throughout this disclosure (e.g., ceiling ((M3*DRX_cycle length)/1.28)*1.28). An example of option 2 is shown in Table 9 below.

TABLE 9

| eDRX_IDLE cycle length[s] | DRX cycle length [s] | PTW length[s] (number of 1.28 s periods) | Tdetect, (NR_Intra[s] number of DRX cycles) | Tmeasure, NR_Intra[s] (number of DRX cycles) | Tevaluate, NR_Intra[s] (number of DRX cycles) |
|---|---|---|---|---|---|
| 20.48 ≤ eDRX_IDLE cycle length ≤ 10485.76 | 0.32<br>0.64<br>1.28<br>2.56 | ≥ceiling (max {M1, M2} *DRX_cycle/ 1.28) *1.28 | eDRX_cycle* ceiling(M3/ ceiling (PTW/ DRX_cycle)) | 0.32 × M1<br>0.64 × M1<br>1.28 × M1<br>2.56 × M1 | 0.32 × M2<br>0.64 × M2<br>1.28 × M2<br>2.56 × M2 |

When eDRX<=10.24 s for IDLE mode and inactive mode in FR1, RedCap UEs and networks may implement the following: 1. The intra-frequency/inter-frequency cell measurement period may comprise an M4*eDRX cycle period (e.g., M4=1) when 2.56 s<=eDRX<=10.24 s for IDLE mode and inactive mode; 2. The intra-frequency/inter-frequency cell evaluation period may comprise an M5*eDRX cycle period (e.g., M5<=3) when 2.56 s<=eDRX<=10.24 s for IDLE mode and inactive mode; and 3. The intra-frequency/inter-frequency cell detection period may comprise an M6*eDRX cycle period (e.g., M6<=23) when 2.56 s<=eDRX<=10.24 s for IDLE mode and inactive mode.

With respect to intra-frequency and inter-frequency cell measurements with eDRX for RedCap UE in FR2, intra-frequency cell detection/measurement/evaluation when eDRX>10.24 s for IDLE mode may include various options and sub-options. For instance, in a first option, RedCap UEs and networks can assume that the intra-frequency/inter-frequency cell measurement period and beam sweeping procedure may be performed within a single PTW. In such embodiments, RedCap UEs and networks can also assume that the intra-frequency/inter-frequency cell evaluation period and beam sweeping procedure may be performed within a single PTW. However, such intra-frequency/inter-frequency cell measurement periods (including associated beam sweeping) and intra-frequency/inter-frequency cell evaluation periods (including associated beam sweeping) may be in different PTW windows (e.g., an intra-frequency/inter-frequency cell measurement period may be performed in a first PTW, while an intra-frequency/inter-frequency cell evaluation period may be performed in a second PTW). As such, PTW window design may be based on a function, max {intra-frequency/inter-frequency cell measurement period with beam sweeping, intra-frequency/inter-frequency cell evaluation period with beam sweeping}. Furthermore, the following function may apply in relation to the PTW: PTW>=ceiling (max {X1 (or X2, X3, or X4)*M1, X1 (or X2, X3, or X4)*M2}*DRX_cycle/1.28)*1.28, where M1 is the DRX number for cell measurement with one beam; M2 is the DRX number for cell evaluation with one beam; and X1, X2, X3, and X4 are scaling factors for beam sweeping. Again, the max function may be utilized as described above to ensure that a longer time period in a comparison of the measurement period and evaluation period can be included within a single PTW. Notably, the scaling factors for beam sweeping (i.e., X1, X2, X3, and X4) may each be less than or equal to 8 (e.g., X1, X2, X3, and X4=3) and may each be a same value (i.e., X1=X2=X3=X4) or different values (i.e., one or more of X1, X2, X3, and/or X4 may comprise different values in comparison to each other). In addition, X1 may be a beam sweeping factor for DRX cycle=0.32 s, X2 may be a beam sweeping factor for DRX cycle=0.64 s, X3 may be a beam sweeping factor for DRX cycle=1.28 s, and X4 may be a beam sweeping factor for DRX cycle=2.56 s. Furthermore, regarding cell detection period and PTW window design, the following sub-options may apply: b. RedCap UEs and networks can assume that the intra-frequency/inter-frequency cell detection period with beam sweeping comprises a single PTW; or b. RedCap UEs and networks can assume that the intra-frequency/inter-frequency cell detection period with beam sweeping may be performed in different PTWs. In such embodiments (i.e., Option 1b), the number of PTWs to be used for detection may be associated with a function, ceiling (M3*(X1 (or X2, X3, or X4))/ceiling (PTW/DRX_cycle)), where M3 is the DRX number for cell evaluations. In addition, an example of option 1b is shown in Table 10 below.

TABLE 10

| eDRX_IDLE cycle length [s] | DRX cycle length [s] | PTW length [s] (number of 1.28 s periods) | Tdetect, NR_Intra [s] (number of DRX cycles) | Tmeasure, NR_Intra [s] (number of DRX cycles) | Tevaluate, NR_Intra [s] (number of DRX cycles) |
|---|---|---|---|---|---|
| 20.48 ≤ eDRX_IDLE cycle length ≤ 10485.76 | 0.32 | ≥ceiling (max {M1, M2} *X1*DRX_cycle/ 1.28) *1.28 | eDRX cycle* ceiling(M3*X1/ ceiling (PTW/ DRX_cycle)) | X1*0.32 × M1 | X1*0.32 × M2 |
| | 0.64 | ≥ceiling (max {M1, M2} *X2*DRX_cycle/ 1.28) *1.28 | eDRX_cycle* ceiling(M3*X2/ ceiling (PTW/ DRX_cycle)) | X2*0.64 × M1 | X2*0.64 × M2 |

TABLE 10-continued

| eDRX_IDLE cycle length [s] | DRX cycle length [s] | PTW length [s] (number of 1.28 s periods) | Tdetect, NR_Intra [s] (number of DRX cycles) | Tmeasure, NR_Intra [s] (number of DRX cycles) | Tevaluate, NR_Intra [s] (number of DRX cycles) |
|---|---|---|---|---|---|
| | 1.28 | ≥ceiling (max {M1, M2} *X3*DRX_cycle/ 1.28) *1.28 | eDRX cycle* ceiling(M3*X3/ ceiling (PTW/ DRX_cycle)) | X3*1.28 × M1 | X3*1.28 × M2 |
| | 2.56 | ≥ceiling (max {M1, M2} *X4*DRX_cycle/ 1.28) *1.28 | eDRX cycle* ceiling(M3*X4/ ceiling (PTW/ DRX_cycle)) | X4*2.56 × M1 | X4*2.56 × M2 |

In a second option related to intra-frequency and inter-frequency cell detection, measurement, and evaluation with eDRX for RedCap UE in FR2 when eDRX>10.24 s for IDLE mode, RedCap UEs and networks can assume that the intra-frequency/inter-frequency cell measurement period with respect to a same Rx beam is to occur within a single PTW. However, the measurement period with full beam sweeping could be divided into different PTWs (e.g., a measurement period associated with a first Rx beam may occur entirely within a first PTW, a measurement period associated with a second Rx beam may occur entirely within a second, different PTW, and so forth). The second option may further include RedCap UEs and networks assuming that the intra-frequency/inter-frequency cell evaluation period with respect to a same Rx beam occurs within a single PTW. However, the evaluation period with full beam sweeping may again be divided into different PTWs (e.g., an evaluation period associated with a first Rx beam may occur entirely within a first PTW, an evaluation period associated with a second Rx beam may occur entirely within a second, different PTW, and so forth). The second option may also include RedCap UEs and networks assuming that the intra-frequency/inter-frequency cell detection period with respect to a same Rx beam occurs within a single PTW window. Again, however, the detection period with full beam sweeping could be divided into different PTWs (e.g., a detection period associated with a first Rx beam may occur entirely within a first PTW, a detection period associated with a second Rx beam may occur entirely within a second, different PTW, and so forth).

In contrast, for RedCap UEs in FR1 when eDRX<=10.24 s for IDLE mode and inactive mode, the following may apply: 1. The intra-frequency/inter-frequency cell detection period may comprise an X5 (or X6 or X7)*M4*eDRX cycle period (e.g., M4<=23) when 2.56 s<=eDRX<=10.24 s for IDLE mode and Inactive mode; 2. The intra-frequency/inter-frequency cell measurement period may comprise an X5 (or X6 or X7)*M5*eDRX cycle period (e.g., M5=1) when 2.56 s<=eDRX<=10.24 s for IDLE mode and Inactive mode; 3. The intra-frequency cell evaluation period may comprise an X5 (or X6 or X7)*M6*eDRX cycle period (e.g., M6<=3) when 2.56 s<=eDRX<=10.24 s for IDLE and Inactive mode. Again, X5, X6, and X7 comprise scaling factors for beam sweeping that are each less than or equal to 8 (e.g., X5, X6, and X7=3). In particular, X5 may be a beam sweeping factor for eDRX cycle=2.56 s, X6 may be a beam sweeping factor for eDRX cycle=5.12 s, and X7 may be a beam sweeping factor for eDRX cycle=10.24 s.

Figure 2:
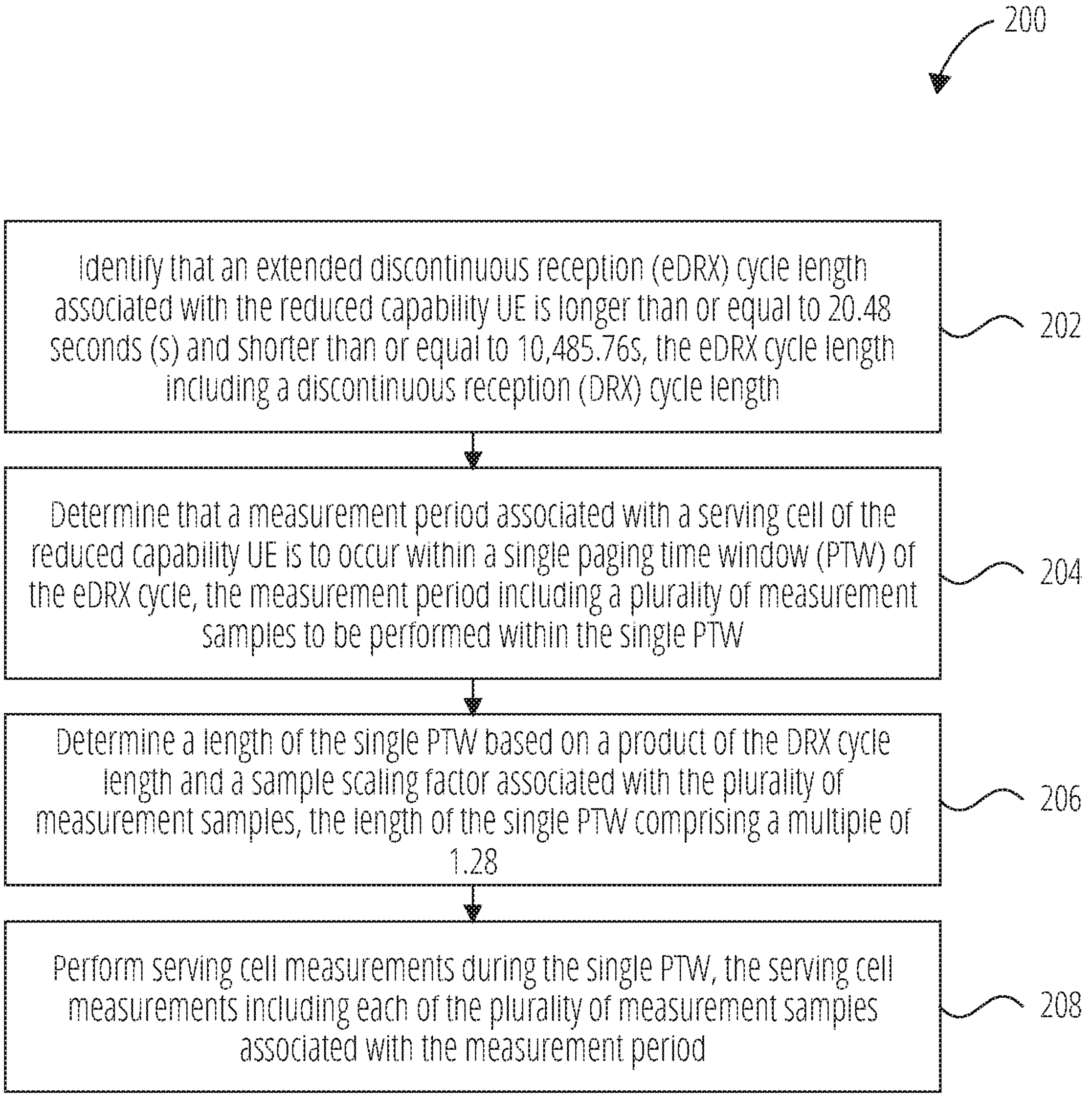
FIG. 2 illustrates a method for serving cell measurements at a reduced capability UE in idle mode in FR1 in accordance with one embodiment.

FIG. 2 illustrates a flowchart of a method 200 for serving cell measurements at a reduced capability user equipment (UE) in idle mode in Frequency Range 1 (FR1). In block 202, the method 200 identifies that an extended discontinuous reception (eDRX) cycle length associated with the reduced capability UE is longer than or equal to 20.48 seconds(s) and shorter than or equal to 10,485.76 s. The eDRX cycle length may include a discontinuous reception (DRX) cycle length. For instance, the eDRX cycle length and DRX cycle length may be similar to the eDRX cycle 108 and the DRX cycle 104 illustrated in FIG. 1.

In block 204, the method 200 determines that a measurement period associated with a serving cell of the reduced capability UE is to occur within a single paging time window (PTW) of the eDRX cycle. For instance, the PTW may be similar to the PTW 106*a* of FIG. 1. The measurement period may include a plurality of measurement samples to be performed within the single PTW. In block 206, the method 200 determines a length of the single PTW based on a product of the DRX cycle length and a sample scaling factor associated with the plurality of measurement samples. The length of the single PTW may comprise a multiple of 1.28. In block 208, the method 200 performs serving cell measurements during the single PTW. The serving cell measurements may include each of the plurality of measurement samples associated with the measurement period.

The method 200 may further include the plurality of measurement samples comprising an entirety of measurement samples associated with the measurement period of the serving cell. The method 200 may further include, when the product of the DRX cycle length and the sample scaling factor is not a factor of 1.28, determining the length of the single PTW further includes generating an integer by rounding up to a nearest integer that is more than a resulting value of the product divided by 1.28, and multiplying the integer by 1.28 to thereby generate the length of the single PTW.

The method 200 may further include generating the integer including performing a ceiling function on the resulting value of the product divided by 1.28. The method 200 may further include, when a synchronization signal block (SSB) based measurement timing configuration (SMTC) periodicity is greater than 20 milliseconds (ms) and the DRX cycle length is less than or equal to 0.64 s, determining the length of the single PTW further includes multiplying the product of the DRX cycle length and the sample scaling factor by a scaling factor k to thereby generate a new product.

The method 200 may further include, when the new product is not a factor of 1.28, determining the length of the single PTW further includes generating an integer by rounding up to a nearest integer that is more than a resulting value of the new product divided by 1.28 and multiplying the integer by 1.28 to thereby generate the length of the single PTW.

Figure 3:
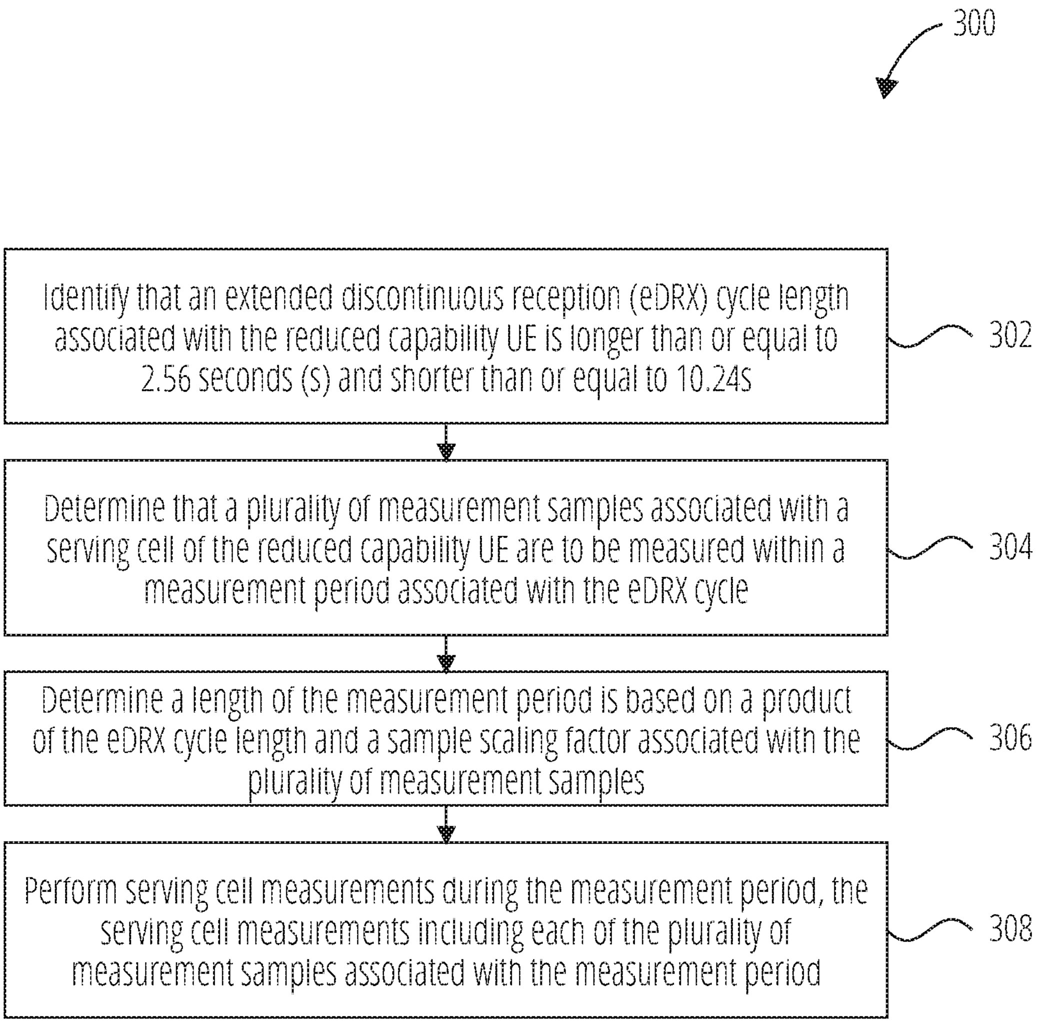
FIG. 3 illustrates a method for serving cell measurements at a reduced capability UE in idle mode or inactive mode in FR1 in accordance with one embodiment.

FIG. 3 illustrates a flowchart of a method 300 for serving cell measurements at a reduced capability user equipment (UE) in idle mode or inactive mode in Frequency Range 1 (FR1). In block 302, the method 300 identifies that an extended discontinuous reception (eDRX) cycle length associated with the reduced capability UE is longer than or equal to 2.56 seconds(s) and shorter than or equal to 10.24 s. For instance, the eDRX cycle length may be similar to the eDRX cycle 108 of FIG. 1.

In block 304, the method 300 determines that a plurality of measurement samples associated with a serving cell of the reduced capability UE are to be measured within a measurement period associated with the eDRX cycle. For instance, the measurement period may be included within a single eDRX cycle. In block 306, the method 300 determines a length of the measurement period is based on a product of the eDRX cycle length and a sample scaling factor associated with the plurality of measurement samples. In an example, the measurement period may comprise a single eDRX cycle. In block 308, the method 300 performs serving cell measurements during the measurement period. The serving cell measurements may include each of the plurality of measurement samples associated with the measurement period.

Figure 4:
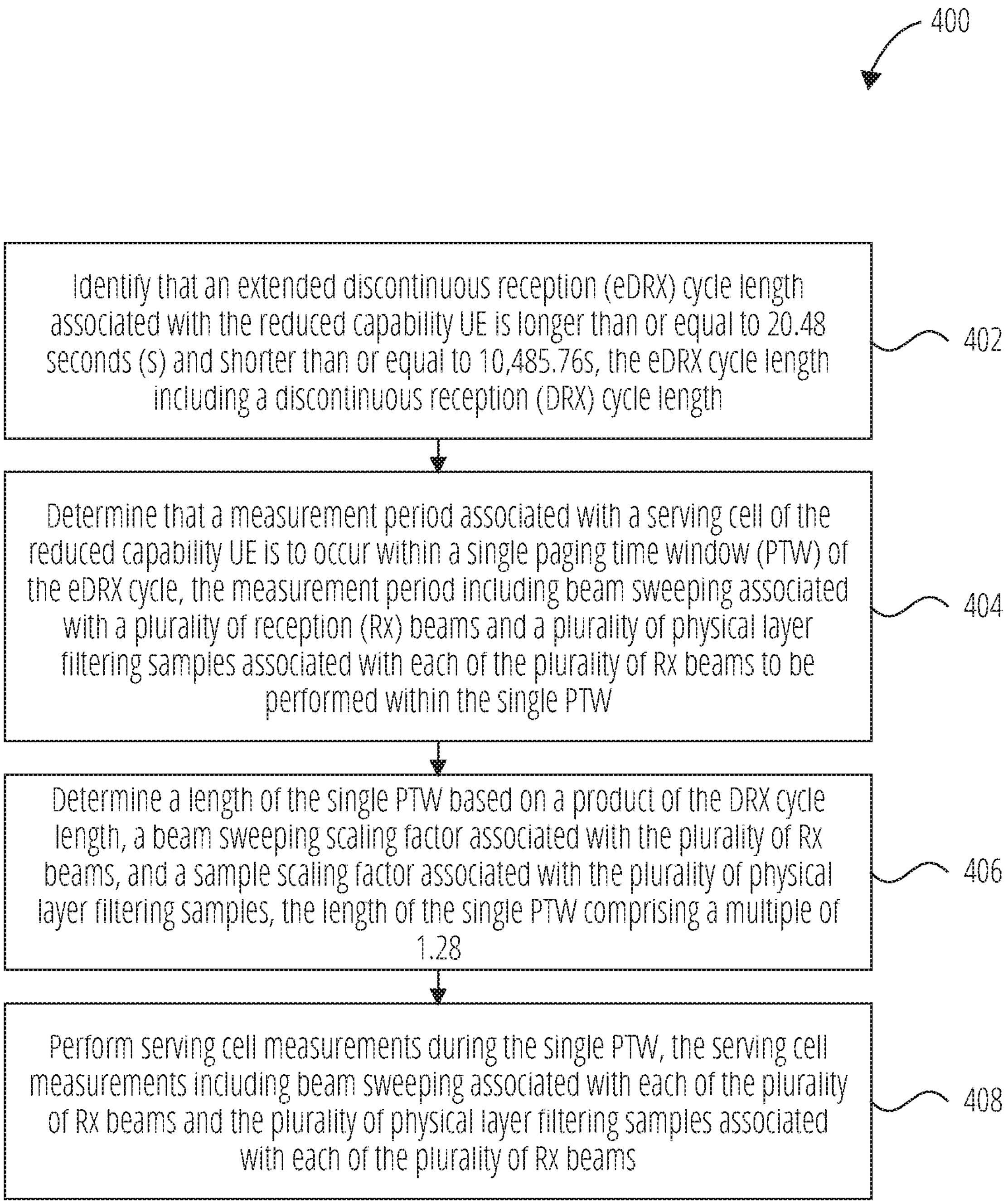
FIG. 4 illustrates a method for serving cell measurements at a reduced capability UE in idle mode in FR2 in accordance with one embodiment.

FIG. 4 illustrates a flowchart of a method 400 for serving cell measurements at a reduced capability user equipment (UE) in idle mode in Frequency Range 2 (FR2). In block 402, the method 400 identifies that an extended discontinuous reception (eDRX) cycle length associated with the reduced capability UE is longer than or equal to 20.48 seconds(s) and shorter than or equal to 10,485.76 s. The eDRX cycle length may include a discontinuous reception (DRX) cycle length. For instance, the eDRX cycle length and the DRX cycle length may be similar to the eDRX cycle 108 and the DRX cycle 104 of FIG. 1.

In block 404, the method 400 determines that a measurement period associated with a serving cell of the reduced capability UE is to occur within a single paging time window (PTW) of the eDRX cycle. The measurement period may include beam sweeping associated with a plurality of reception (Rx) beams and a plurality of physical layer filtering samples associated with each of the plurality of Rx beams to be performed within the single PTW. In block 406, the method 400 determines a length of the single PTW based on a product of the DRX cycle length, a beam sweeping scaling factor associated with the plurality of Rx beams, and a sample scaling factor associated with the plurality of physical layer filtering samples. The length of the single PTW may comprise a multiple of 1.28. In block 408, the method 400 performs serving cell measurements during the single PTW. The serving cell measurements may include beam sweeping associated with each of the plurality of Rx beams and the plurality of physical layer filtering samples associated with each of the plurality of Rx beams.

The method 400 may further include the plurality of Rx beams comprising an entirety of Rx beams. The method 400 may further include the DRX cycle length comprising one of a plurality of possible DRX cycle lengths and the beam sweeping scaling factor comprising one of a plurality of beam sweeping scaling factors. Each of the plurality of beam sweeping scaling factors may be associated with a given DRX cycle length of the plurality of possible DRX cycle lengths.

The method 400 may further include at least a first beam sweeping scaling factor of the plurality of beam sweeping scaling factors and at least a second beam sweeping scaling factor of the plurality of beam sweeping scaling factors comprising a same value. The method 400 may further include a first beam sweeping scaling factor of the plurality of beam sweeping scaling factors comprising a first value and a second beam sweeping scaling factor of the plurality of beam sweeping scaling factors comprising a second, different value.

The method 400 may further include, when the product of the DRX cycle length, the sample scaling factor, and the beam sweeping scaling factor is not a factor of 1.28, determining the length of the single PTW further includes generating an integer by rounding up to a nearest integer that is more than a resulting value of the product divided by 1.28 and multiplying the integer by 1.28 to thereby generate the length of the single PTW.

The method 400 may further include, when a synchronization signal block (SSB) based measurement timing configuration (SMTC) periodicity is greater than 20 milliseconds (ms) and the DRX cycle length is less than or equal to 0.64 s, determining the length of the single PTW further includes multiplying the product of the DRX cycle length, the sample scaling factor, and the beam sweeping scaling factor by a scaling factor k to thereby generate a new product.

The method 400 may further include, when the new product is not a factor of 1.28, determining the length of the single PTW further includes generating an integer by rounding up to a nearest integer that is more than a resulting value of the new product divided by 1.28 and multiplying the integer by 1.28 to thereby generate the length of the single PTW.

Figure 5:
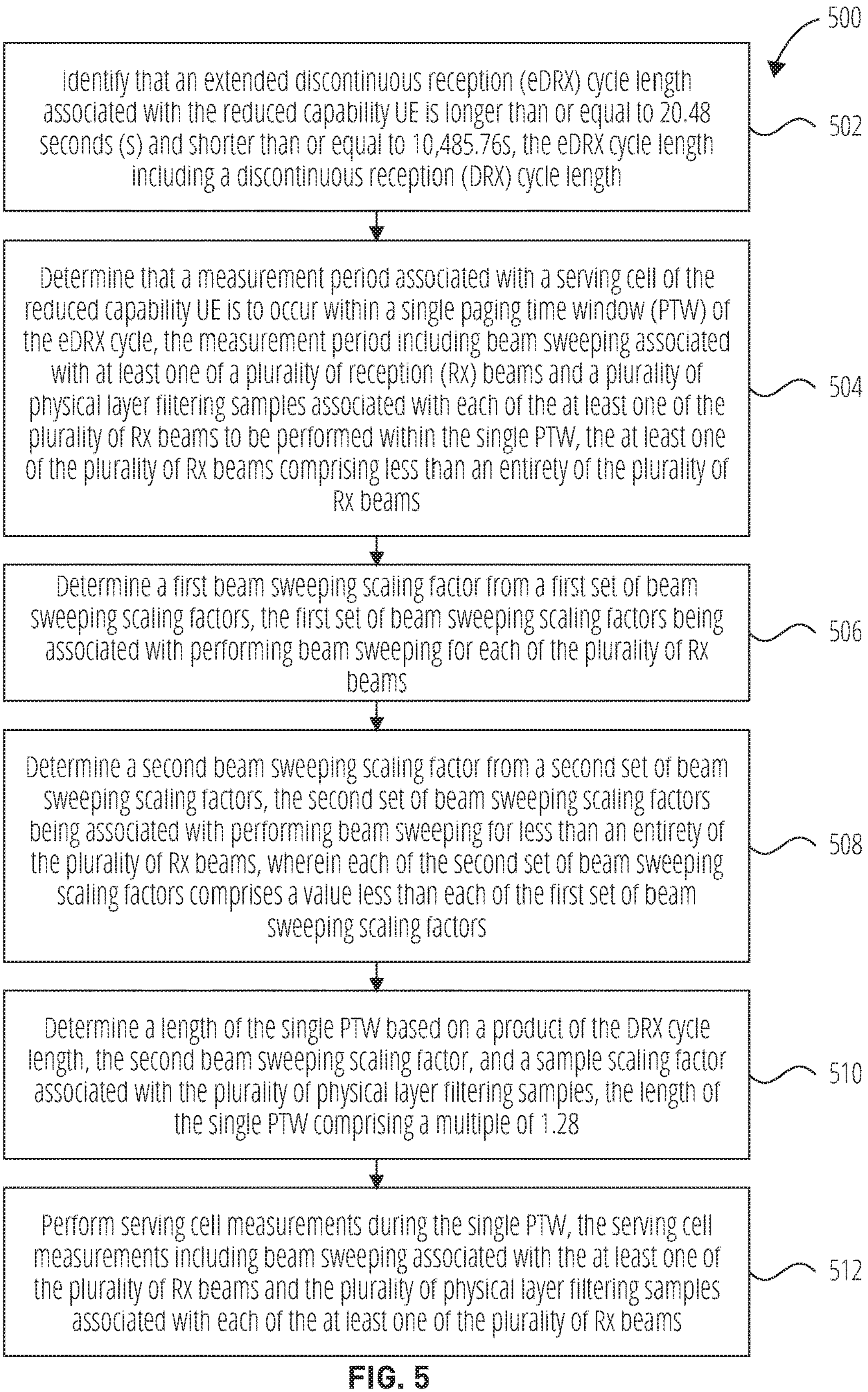
FIG. 5 illustrates a method for serving cell measurements at a reduced capability UE in idle mode in FR2 in accordance with one embodiment.

FIG. 5 illustrates a flowchart of a method 500 for serving cell measurements at a reduced capability user equipment (UE) in idle mode in Frequency Range 2 (FR2). In block 502, the method 500 identifies that an extended discontinuous reception (eDRX) cycle length associated with the reduced capability UE is longer than or equal to 20.48 seconds(s) and shorter than or equal to 10,485.76 s. The eDRX cycle length may include a discontinuous reception (DRX) cycle length. For instance, the eDRX cycle length and the DRX cycle length may be similar to the eDRX cycle 108 and the DRX cycle 104 of FIG. 1.

In block 504, the method 500 determines that a measurement period associated with a serving cell of the reduced capability UE is to occur within a single paging time window (PTW) of the eDRX cycle. For instance, such a PTW may comprise the PTW **106*a* of FIG. 1**. The measurement period may include beam sweeping associated with at least one of a plurality of reception (Rx) beams and a plurality of physical layer filtering samples associated with each of the at least one of the plurality of Rx beams to be performed within the single PTW. The at least one of the plurality of Rx beams may comprise less than an entirety of the plurality of Rx beams.

In block 506, the method 500 determines a first beam sweeping scaling factor from a first set of beam sweeping scaling factors. The first set of beam sweeping scaling factors may be associated with performing beam sweeping for each of the plurality of Rx beams. In block 508, the method 500 determines a second beam sweeping scaling factor from a second set of beam sweeping scaling factors. The second set of beam sweeping scaling factors may be associated with performing beam sweeping for less than an entirety of the plurality of Rx beams. Each of the second set of beam sweeping scaling factors may comprise a value less than each of the first set of beam sweeping scaling factors.

In block 510, the method 500 determines a length of the single PTW based on a product of the DRX cycle length, the second beam sweeping scaling factor, and a sample scaling factor associated with the plurality of physical layer filtering samples. The length of the single PTW may comprise a multiple of 1.28. In block 512, the method 500 performs serving cell measurements during the single PTW. The serving cell measurements may include beam sweeping associated with the at least one of the plurality of Rx beams and the plurality of physical layer filtering samples associated with each of the at least one of the plurality of Rx beams.

The method 500 may further include the DRX cycle length comprising one of a plurality of possible DRX cycle lengths. Each of the second set of beam sweeping scaling factors being associated with a given DRX cycle length of the plurality of possible DRX cycle lengths. The method 500 may further include the second beam sweeping scaling factor of the second set of beam sweeping scaling factors and a third beam sweeping scaling factor of the second set of beam sweeping scaling factors comprising a same value.

The method 500 may further include the second beam sweeping scaling factor of the second set of beam sweeping scaling factors comprising a first value and a third beam sweeping scaling factor of the second set of beam sweeping scaling factors comprising a second, different value. The method 500 may further include, when the product of the DRX cycle length, the sample scaling factor, and the second beam sweeping scaling factor is not a factor of 1.28, determining the length of the single PTW further includes generating an integer by rounding up to a nearest integer that is more than a resulting value of the product divided by 1.28 and multiplying the integer by 1.28 to thereby generate the length of the single PTW.

The method 500 may further include, when a synchronization signal block (SSB) based measurement timing configuration (SMTC) periodicity is greater than 20 milliseconds (ms) and the DRX cycle length is less than or equal to 0.64 s, determining the length of the single PTW further includes multiplying the product of the DRX cycle length, the sample scaling factor, and the second beam sweeping scaling factor by a scaling factor k to thereby generate a new product. The method 500 may further include, when the new product is not a factor of 1.28, determining the length of the single PTW further includes generating an integer by rounding up to a nearest integer that is more than a resulting value of the new product divided by 1.28 and multiplying the integer by 1.28 to thereby generate the length of the single PTW.

Figure 6:
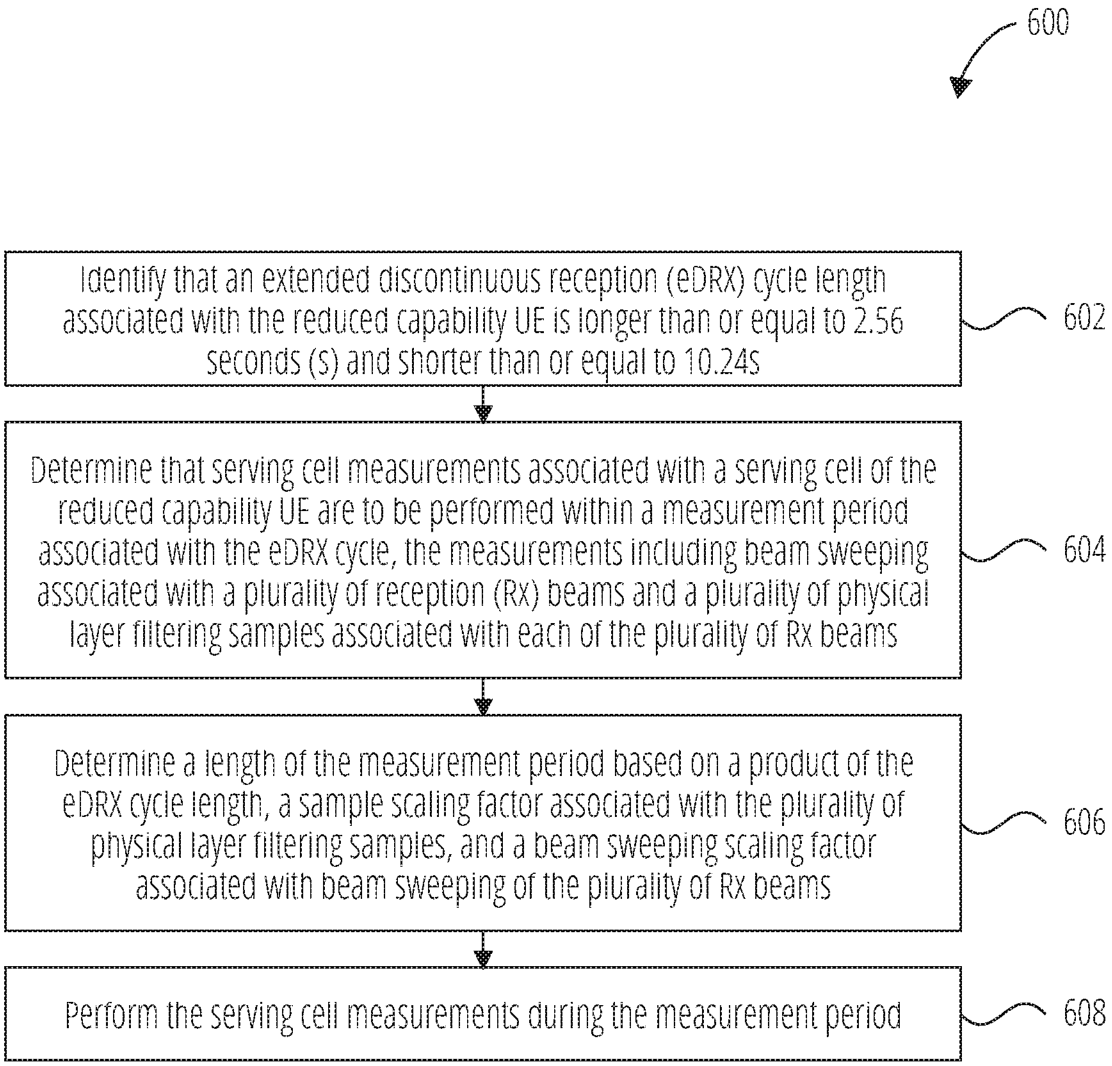
FIG. 6 illustrates a method for serving cell measurements at a reduced capability UE in idle mode or inactive mode in FR2 in accordance with one embodiment.

FIG. 6 illustrates a flowchart of a method 600 for serving cell measurements at a reduced capability user equipment (UE) in idle mode or inactive mode in Frequency Range 2 (FR2). In block 602, the method 600 identifies that an extended discontinuous reception (eDRX) cycle length associated with the reduced capability UE is longer than or equal to 2.56 seconds(s) and shorter than or equal to 10.24 s. For instance, the eDRX cycle length may be similar to the eDRX cycle 108 of FIG. 1. In block 604, the method 600 determines that serving cell measurements associated with a serving cell of the reduced capability UE are to be performed within a measurement period associated with the eDRX cycle. The measurements may include beam sweeping associated with a plurality of reception (Rx) beams and a plurality of physical layer filtering samples associated with each of the plurality of Rx beams. In block 606, the method 600 determines a length of the measurement period based on a product of the eDRX cycle length, a sample scaling factor associated with the plurality of physical layer filtering samples, and a beam sweeping scaling factor associated with beam sweeping of the plurality of Rx beams. In an example, the measurement period may comprise an eDRX cycle. In block 608, the method 600 performs the serving cell measurements during the measurement period.

The method 600 may further include the eDRX cycle length comprising one of a plurality of possible eDRX cycle lengths and the beam sweeping scaling factor comprising one of a plurality of beam sweeping scaling factors. Each of the plurality of beam sweeping scaling factors being associated with a given eDRX cycle length of the plurality of possible eDRX cycle lengths. The method 600 may further include at least a first beam sweeping scaling factor of the plurality of beam sweeping scaling factors and at least a second beam sweeping scaling factor of the plurality of beam sweeping scaling factors comprise a same value. The method 600 may further include a first beam sweeping scaling factor of the plurality of beam sweeping scaling factors comprising a first value and a second beam sweeping scaling factor of the plurality of beam sweeping scaling factors comprising a second, different value.

Figure 7:
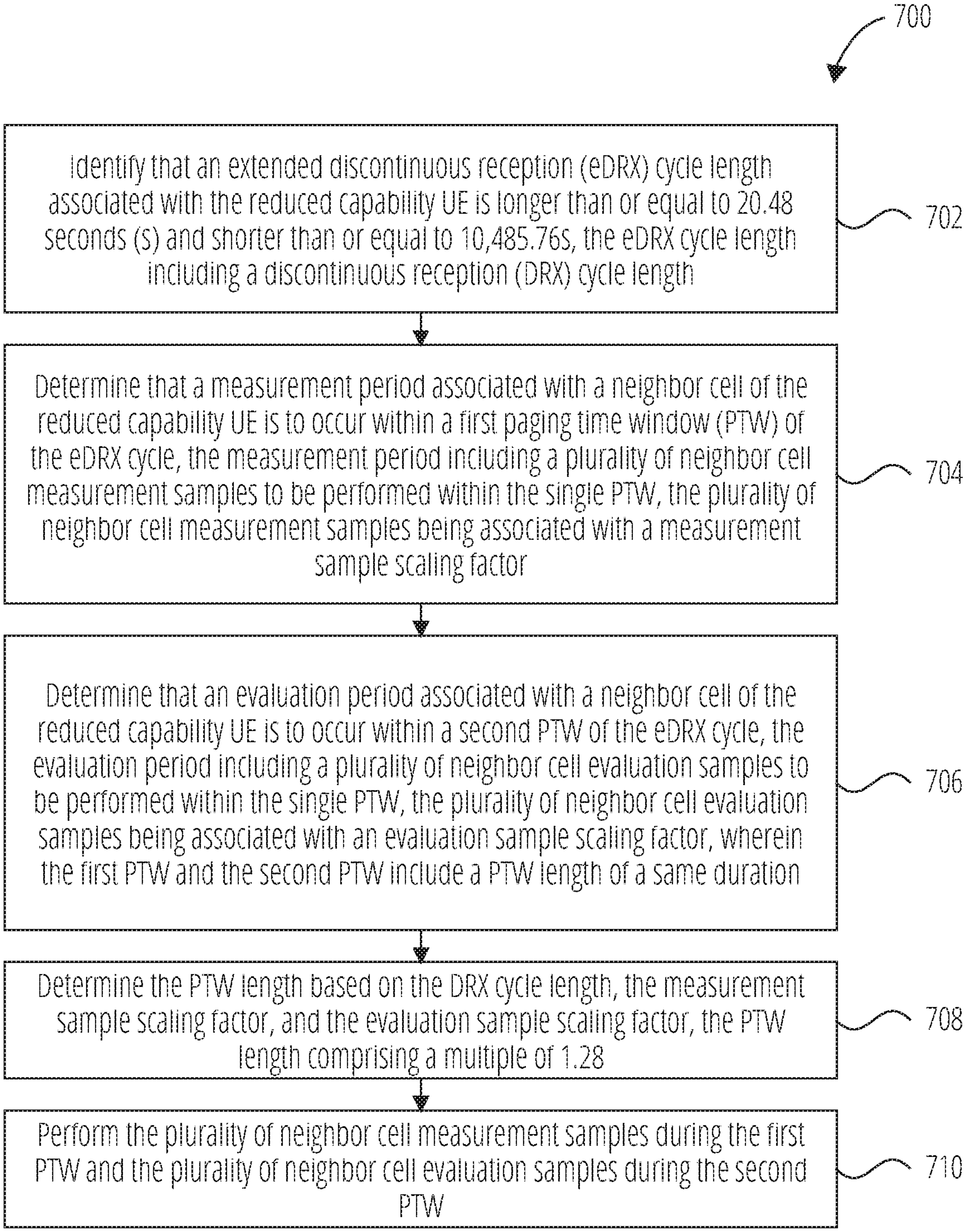
FIG. 7 illustrates a method for intra-frequency or inter-frequency neighbor cell measurements at a reduced capability UE in idle mode in FR1 in accordance with one embodiment.

FIG. 7 illustrates a flowchart of a method 700 for intra-frequency or inter-frequency neighbor cell measurements at a reduced capability user equipment (UE) in idle mode in Frequency Range 1 (FR1). In block 702, the method 700 identifies that an extended discontinuous reception (eDRX) cycle length associated with the reduced capability UE is longer than or equal to 20.48 seconds(s) and shorter than or equal to 10,485.76 s. The eDRX cycle length may include a discontinuous reception (DRX) cycle length.

In block 704, the method 700 determines that a measurement period associated with a neighbor cell of the reduced capability UE is to occur within a first paging time window (PTW) of the eDRX cycle. The measurement period may include a plurality of neighbor cell measurement samples to be performed within the single PTW. The plurality of neighbor cell measurement samples may be associated with a measurement sample scaling factor.

In block 706, the method 700 determines that an evaluation period associated with a neighbor cell of the reduced capability UE is to occur within a second PTW of the eDRX cycle. The evaluation period may include a plurality of neighbor cell evaluation samples to be performed within the single PTW. The plurality of neighbor cell evaluation samples may be associated with an evaluation sample scaling factor. The first PTW and the second PTW may include a PTW length of a same duration.

In block 708, the method 700 determines the PTW length based on the DRX cycle length, the measurement sample scaling factor, and the evaluation sample scaling factor. The PTW length may comprise a multiple of 1.28. In block 710, the method 700 performs the plurality of neighbor cell measurement samples during the first PTW and the plurality of neighbor cell evaluation samples during the second PTW. For instance, the first PTW may comprise the PTW 106*a* of FIG. 1 and the second PTW may comprise the PTW 106*b*.

The method 700 may further include determining the PTW length further comprises determining which of the measurement sample scaling factor and the evaluation sample scaling factor comprises a larger value, generating a product of the larger value and the DRX cycle length, generating an integer by rounding up to the nearest integer that is more than a resulting value of the product divided by 1.28, and multiplying the integer by 1.28 to thereby generate the PTW length.

The method 700 may further include determining which of the measurement sample scaling factor and the evaluation sample scaling factor comprises a larger value includes performing a max function on the measurement sample scaling factor and the evaluation sample scaling factor. The method 700 may further include generating the integer includes performing a ceiling function on the product divided by 1.28. The method 700 may further include the first PTW and the second PTW are a same PTW. The method 700 may further include the first PTW and the second PTW are different PTWs.

Figure 8:
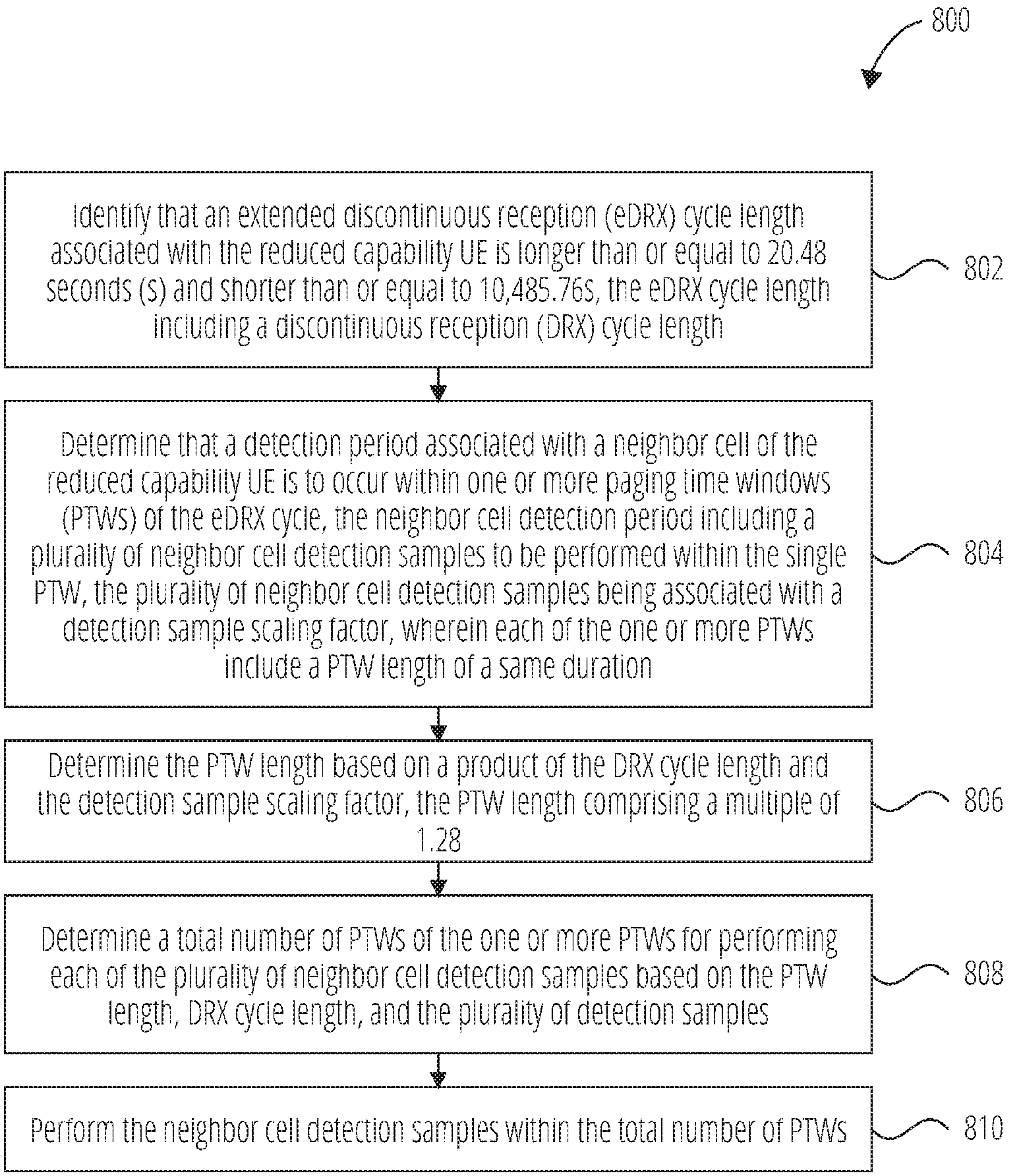
FIG. 8 illustrates a method for intra-frequency or inter-frequency neighbor cell measurements at a reduced capability UE in idle mode in FR1 in accordance with one embodiment.

FIG. 8 illustrates a flowchart of a method 800 for intra-frequency or inter-frequency neighbor cell measurements at a reduced capability user equipment (UE) in idle mode in Frequency Range 1 (FR1). In block 802, the method 800 identifies that an extended discontinuous reception (eDRX) cycle length associated with the reduced capability UE is longer than or equal to 20.48 seconds(s) and shorter than or equal to 10,485.76 s. The eDRX cycle length may include a discontinuous reception (DRX) cycle length.

In block 804, the method 800 determines that a detection period associated with a neighbor cell of the reduced capability UE is to occur within one or more paging time windows (PTWs) of the eDRX cycle. The neighbor cell detection period may include a plurality of neighbor cell detection samples to be performed within the single PTW. The plurality of neighbor cell detection samples may be associated with a detection sample scaling factor. Each of the one or more PTWs include a PTW length of a same duration.

In block 806, the method 800 determines the PTW length based on a product of the DRX cycle length and the detection sample scaling factor. The PTW length may comprise a multiple of 1.28. In block 808, the method 800 determines a total number of PTWs of the one or more PTWs for performing each of the plurality of neighbor cell detection samples based on the PTW length, DRX cycle length, and the plurality of detection samples. For instance, the total number of PTWs may comprise a single or multiple PTWs. In block 810, the method 800 performs the neighbor cell detection samples within the total number of PTWs. For instance, the neighbor cell detection samples may be performed within the PTW 106*a* of FIG. 1 when the total number of PTWs comprises a single PTW.

The method 800 may further include, when the product of the DRX cycle length and the detection sample scaling factor is not a factor of 1.28, determining the PTW length further includes generating an integer by rounding up to a nearest integer that is more than a resulting value of the product divided by 1.28 and multiplying the integer by 1.28 to thereby generate the PTW length.

The method 800 may further include determining the total number of PTWs further includes generating a first integer by rounding up to a first nearest integer that is more than a first resulting value of the PTW length divided by the DRX cycle length and generating a second integer by rounding up to a second nearest integer that is more than a second resulting value of the plurality of detection samples divided by the first integer. The second integer may comprise the total number of PTWs. The method 800 may further include the total number of PTWs comprising a single PTW.

Figure 9:
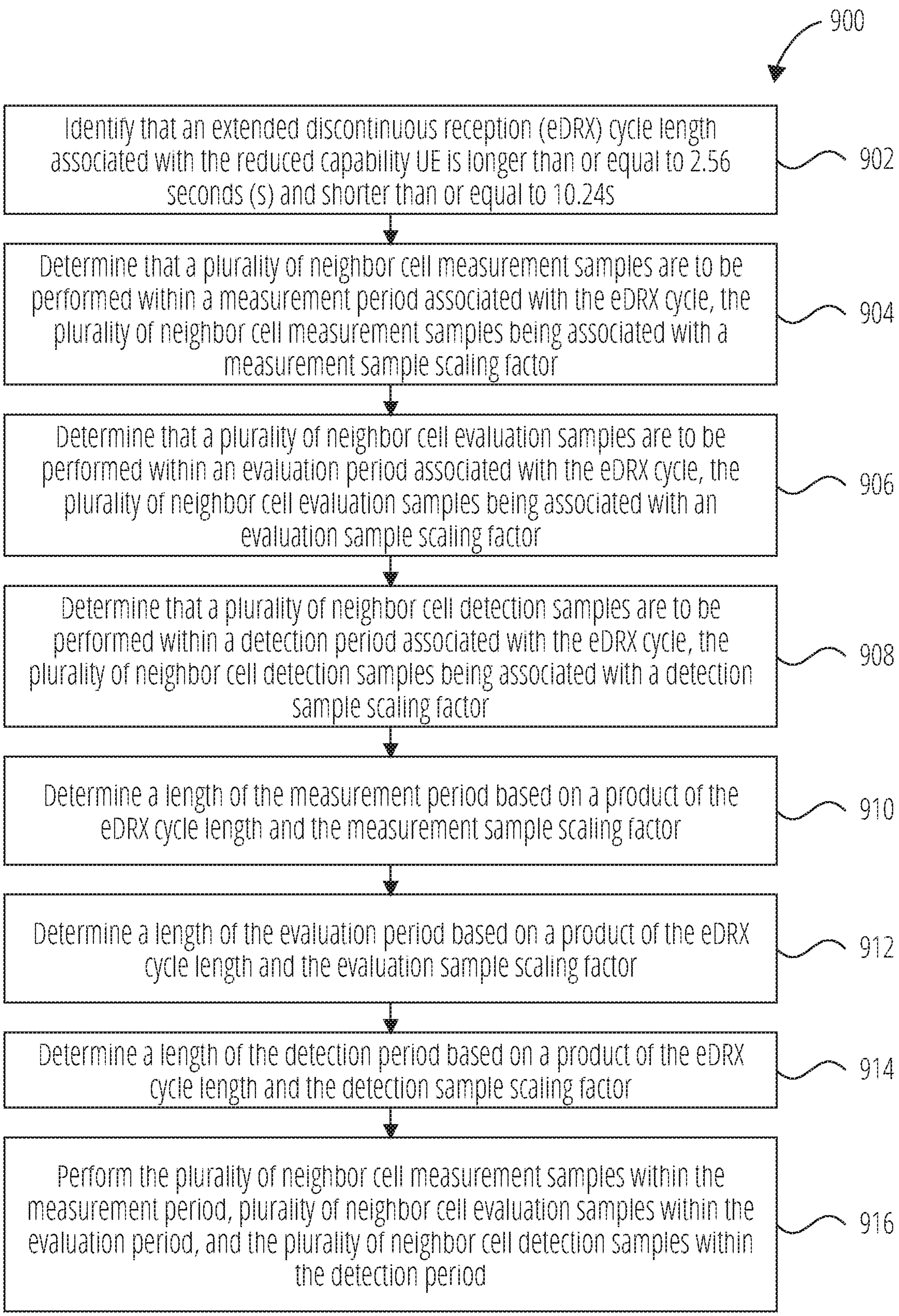
FIG. 9 illustrates a method for intra-frequency or inter-frequency neighbor cell measurements at a reduced capability UE in idle mode or inactive mode in FR1 in accordance with one embodiment.

FIG. 9 illustrates a flowchart of a method 900 for intra-frequency or inter-frequency neighbor cell measurements at a reduced capability user equipment (UE) in idle mode or inactive mode in Frequency Range 1 (FR1). In block 902, the method 900 identifies that an extended discontinuous reception (eDRX) cycle length associated with the reduced capability UE is longer than or equal to 2.56 seconds(s) and shorter than or equal to 10.24 s. For instance, the eDRX cycle length may be similar to the eDRX cycle 108 of FIG. 1.

In block 904, the method 900 determines that a plurality of neighbor cell measurement samples are to be performed within a measurement period associated with the eDRX cycle. The plurality of neighbor cell measurement samples may be associated with a measurement sample scaling factor. In block 906, the method 900 determines that a plurality of neighbor cell evaluation samples are to be performed within an evaluation period associated with the eDRX cycle. The plurality of neighbor cell evaluation samples may be associated with an evaluation sample scaling factor.

In block 908, the method 900 determines that a plurality of neighbor cell detection samples are to be performed within a detection period associated with the eDRX cycle. The plurality of neighbor cell detection samples may be associated with a detection sample scaling factor. In block 910, the method 900 determines a length of the measurement period based on a product of the eDRX cycle length and the measurement sample scaling factor. For instance, the measurement period length may comprise an eDRX cycle length.

In block 912, the method 900 determines a length of the evaluation period based on a product of the eDRX cycle length and the evaluation sample scaling factor. For instance, the evaluation period length may comprise an eDRX cycle length. In block 914, the method 900 determines a length of the detection period based on a product of the eDRX cycle length and the detection sample scaling factor. For instance, the detection period length may comprise an eDRX cycle length. In block 916, the method 900 performs the plurality of neighbor cell measurement samples within the measurement period, plurality of neighbor cell evaluation samples within the evaluation period, and the plurality of neighbor cell detection samples within the detection period.

Figure 10:
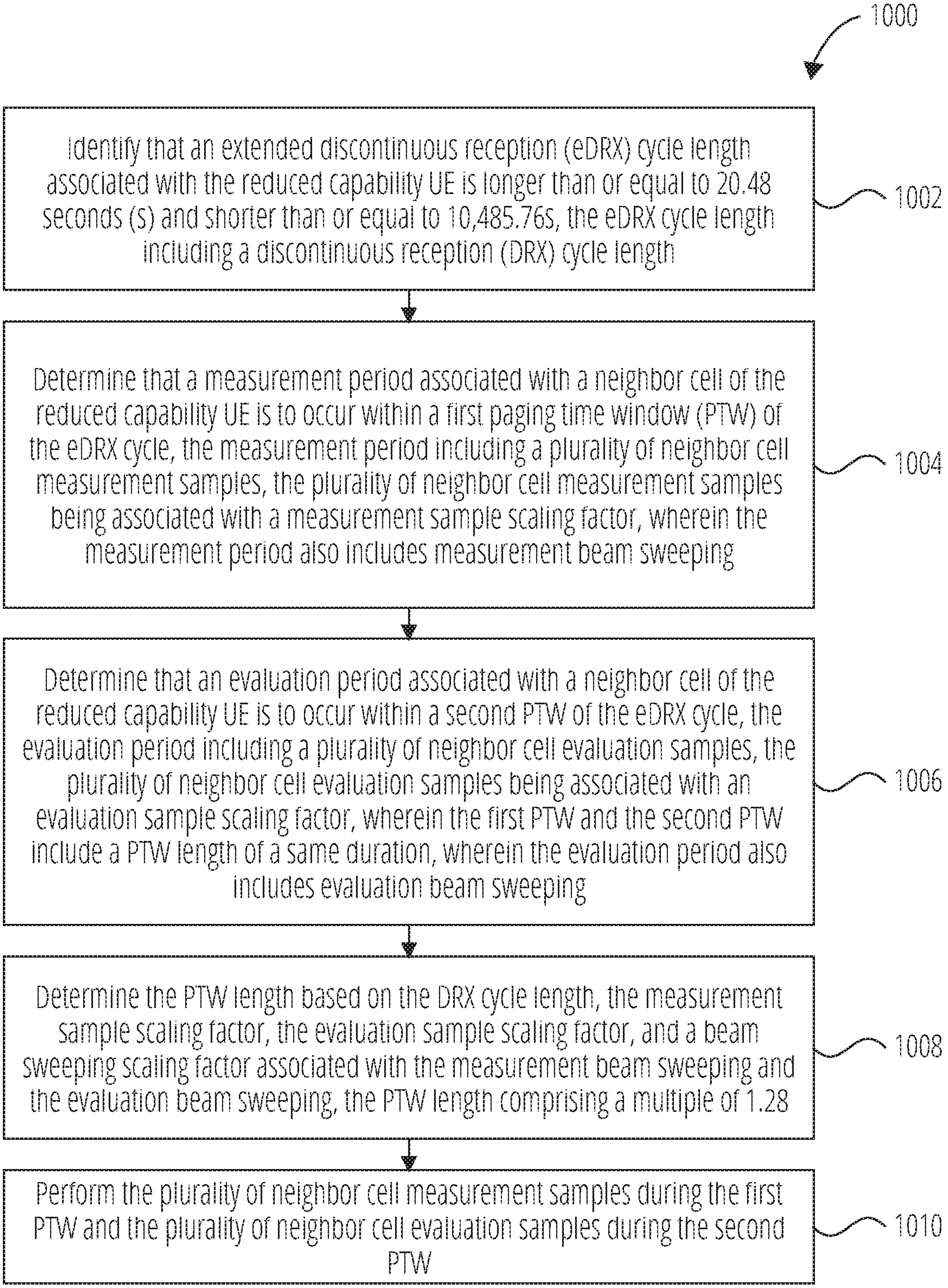
FIG. 10 illustrates a method for intra-frequency or inter-frequency neighbor cell measurements at a reduced capability UE in idle mode in FR2 in accordance with one embodiment.

FIG. 10 illustrates a flowchart of a method 1000 for intra-frequency or inter-frequency neighbor cell measurements at a reduced capability user equipment (UE) in idle mode in Frequency Range 2 (FR2). In block 1002, the method 1000 identifies that an extended discontinuous reception (eDRX) cycle length associated with the reduced capability UE is longer than or equal to 20.48 seconds(s) and shorter than or equal to 10,485.76 s. The eDRX cycle length may include a discontinuous reception (DRX) cycle length.

In block 1004, the method 1000 determines that a measurement period associated with a neighbor cell of the reduced capability UE is to occur within a first paging time window (PTW) of the eDRX cycle. The measurement period may include a plurality of neighbor cell measurement samples. The plurality of neighbor cell measurement samples may be associated with a measurement sample scaling factor. The measurement period may also include measurement beam sweeping.

In block 1006, the method 1000 determines that an evaluation period associated with a neighbor cell of the reduced capability UE is to occur within a second PTW of the eDRX cycle. The evaluation period may include a plurality of neighbor cell evaluation samples. The plurality of neighbor cell evaluation samples may be associated with an evaluation sample scaling factor. The first PTW and the second PTW may include a PTW length of a same duration. The evaluation period may also include evaluation beam sweeping.

In block 1008, the method 1000 determines the PTW length based on the DRX cycle length, the measurement sample scaling factor, the evaluation sample scaling factor, and a beam sweeping scaling factor associated with the measurement beam sweeping and the evaluation beam sweeping. The PTW length may comprise a multiple of 1.28. In block 1010, the method 1000 performs the plurality of neighbor cell measurement samples during the first PTW and the plurality of neighbor cell evaluation samples during the second PTW. For instance, the plurality of neighbor cell measurement samples may be performed during the PTW 106*a* and the plurality of neighbor cell evaluation samples may be performed during the PTW 106*b*.

The method 1000 may further include determining the PTW length further comprises determining which of a first product and a second product comprises a larger value. The first product may comprise the measurement sample scaling factor multiplied by the beam sweeping scaling factor and the second product may comprise the evaluation sample scaling factor multiplied by the beam sweeping scaling factor. Determining the PTW length may further comprise generating a third product of the larger value and the DRX cycle length, generating an integer by rounding up to the nearest integer that is more than a resulting value of the product divided by 1.28, and multiplying the integer by 1.28 to thereby generate the PTW length.

The method 1000 may further include determining which of the first product and the second product comprises a larger value includes performing a max function on the first product and the second product. The method 1000 may further include generating the integer includes performing a ceiling function on the third product divided by 1.28. The method 1000 may further include the first PTW and the second PTW being a same PTW.

The method 1000 may further include the first PTW and the second PTW comprising different PTWs. The method 1000 may further include at least a portion of one of the measurement beam sweeping and the evaluation beam sweeping being performed in either the first PTW or the second PTW and in a third PTW that is different than the first PTW and the second PTW. The method 1000 may further include the DRX cycle length comprising one of a plurality of possible DRX cycle lengths and the beam sweeping scaling factor comprising one of a plurality of beam sweeping scaling factors. Each of the plurality of beam sweeping scaling factors may be associated with a given DRX cycle length of the plurality of possible DRX cycle lengths.

The method 1000 may include at least a first beam sweeping scaling factor of the plurality of beam sweeping scaling factors and at least a second beam sweeping scaling factor of the plurality of beam sweeping scaling factors comprising a same value. The method 1000 may include a first beam sweeping scaling factor of the plurality of beam sweeping scaling factors comprising a first value and a second beam sweeping scaling factor of the plurality of beam sweeping scaling factors comprising a second, different value.

Figure 11:
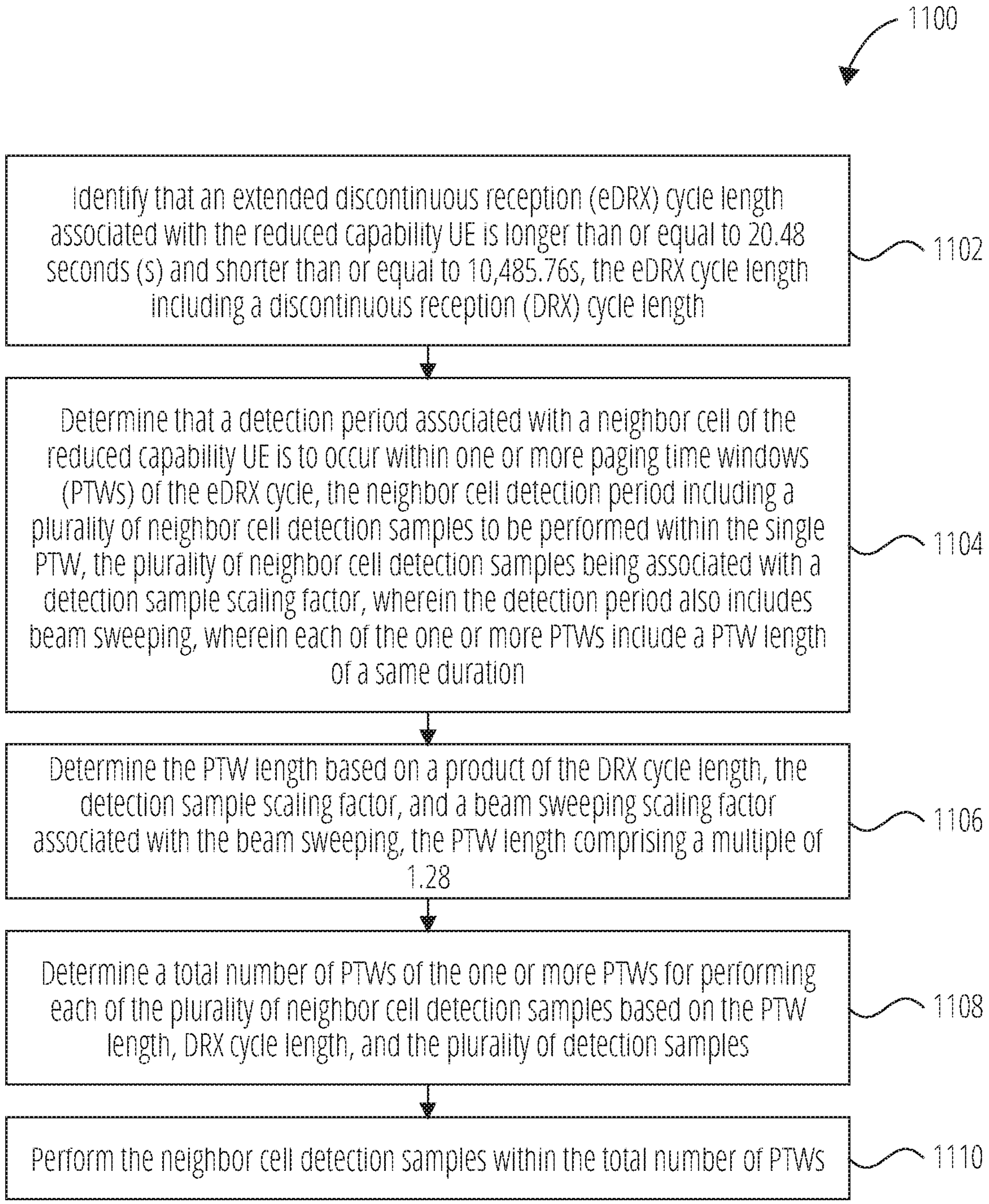
FIG. 11 illustrates a method for intra-frequency or inter-frequency neighbor cell measurements at a reduced capability UE in idle mode in FR2 in accordance with one embodiment.

FIG. 11 illustrates a flowchart of a method 1100 for intra-frequency or inter-frequency neighbor cell measurements at a reduced capability user equipment (UE) in idle mode in Frequency Range 2 (FR2). In block 1102, the method 1100 identifies that an extended discontinuous reception (eDRX) cycle length associated with the reduced capability UE is longer than or equal to 20.48 seconds(s) and shorter than or equal to 10,485.76 s. The eDRX cycle length may include a discontinuous reception (DRX) cycle length.

In block 1104, the method 1100 determines that a detection period associated with a neighbor cell of the reduced capability UE is to occur within one or more paging time windows (PTWs) of the eDRX cycle. The neighbor cell detection period may include a plurality of neighbor cell detection samples to be performed within the single PTW. The plurality of neighbor cell detection samples may be associated with a detection sample scaling factor. The detection period may also include beam sweeping. Each of the one or more PTWs may include a PTW length of a same duration.

In block 1106, the method 1100 determines the PTW length based on a product of the DRX cycle length, the detection sample scaling factor, and a beam sweeping scaling factor associated with the beam sweeping. The PTW length may comprise a multiple of 1.28. In block 1108, the method 1100 determines a total number of PTWs of the one or more PTWs for performing each of the plurality of neighbor cell detection samples based on the PTW length, DRX cycle length, and the plurality of detection samples. For instance, the PTW length may comprise a single PTW. In block 1110, the method 1100 performs the neighbor cell detection samples within the total number of PTWs. For instance, when the total number of PTWs comprises one PTW, a PTW such as the PTW 106*a* of FIG. 1 may be used.

The method 1100 may further include, when the product of the DRX cycle length, the detection sample scaling factor, and the beam sweeping scaling factor is not a factor of 1.28, determining the PTW length further includes generating an integer by rounding up to a nearest integer that is more than a resulting value of the product divided by 1.28 and multiplying the integer by 1.28 to thereby generate the PTW length.

The method 1100 may further include determining the total number of PTWs further includes generating a first integer by rounding up to a first nearest integer that is more than a first resulting value of the PTW length divided by the DRX cycle length and generating a second integer by rounding up to a second nearest integer that is more than a second resulting value of dividing a new product of the plurality of detection samples and the beam sweeping scaling factor by the first integer. The second integer comprising the total number of PTWs. The method 1100 may further include the total number of PTWs comprising a single PTW. The method 1100 may further include the beam sweeping being performed during a first PTW of the one or more PTWs and a second PTW of the one or more PTWs.

Figure 12:
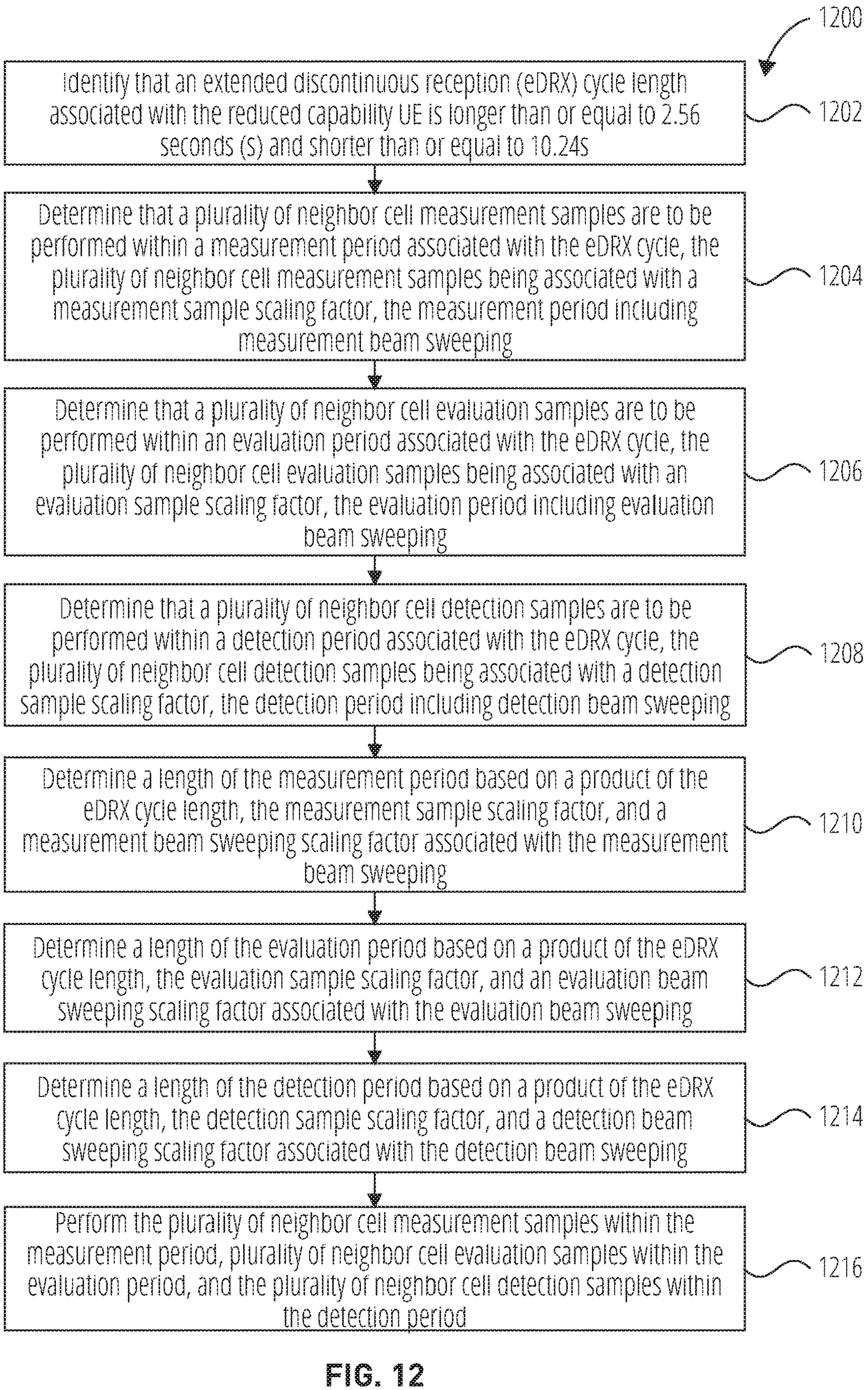
FIG. 12 illustrates a method for intra-frequency or inter-frequency neighbor cell measurements at a reduced capability UE in idle mode or inactive mode in FR2 in accordance with one embodiment.

FIG. 12 illustrates a flowchart of a method 1200 for intra-frequency or inter-frequency neighbor cell measurements at a reduced capability user equipment (UE) in idle mode or inactive mode in Frequency Range 2 (FR2). In block 1202, the method 1200 identifies that an extended discontinuous reception (eDRX) cycle length associated with the reduced capability UE is longer than or equal to 2.56 seconds(s) and shorter than or equal to 10.24 s. For instance, such an eDRX cycle length may be similar to the eDRX cycle 108 of FIG. 1.

In block 1204, the method 1200 determines that a plurality of neighbor cell measurement samples are to be performed within a measurement period associated with the eDRX cycle. The plurality of neighbor cell measurement samples may be associated with a measurement sample scaling factor. The measurement period may also include measurement beam sweeping. In block 1206, the method 1200 determines that a plurality of neighbor cell evaluation samples are to be performed within an evaluation period associated with the eDRX cycle. The plurality of neighbor cell evaluation samples may be associated with an evaluation sample scaling factor. The evaluation period may also include evaluation beam sweeping.

In block 1208, the method 1200 determines that a plurality of neighbor cell detection samples are to be performed within a detection period associated with the eDRX cycle. The plurality of neighbor cell detection samples may be associated with a detection sample scaling factor. The detection period may include detection beam sweeping. In block 1210, the method 1200 determines a length of the measurement period based on a product of the eDRX cycle length, the measurement sample scaling factor, and a measurement beam sweeping scaling factor associated with the measurement beam sweeping. For instance, the measurement period length may comprise a number of eDRX cycles (e.g., as little as one and potentially, many).

In block 1212, the method 1200 determines a length of the evaluation period based on a product of the eDRX cycle length, the evaluation sample scaling factor, and an evaluation beam sweeping scaling factor associated with the evaluation beam sweeping. For instance, the evaluation period length may comprise a number of eDRX cycles (e.g., as little as one and potentially, many). In block 1214, the method 1200 determines a length of the detection period based on a product of the eDRX cycle length, the detection sample scaling factor, and a detection beam sweeping scaling factor associated with the detection beam sweeping. For instance, the detection period length may comprise a number of eDRX cycles (e.g., as little as one and potentially, many). In block 1216, the method 1200 performs the plurality of neighbor cell measurement samples within the measurement period, plurality of neighbor cell evaluation samples within the evaluation period, and the plurality of neighbor cell detection samples within the detection period.

The method 1200 may further include the eDRX cycle length comprising one of a plurality of possible eDRX cycle lengths and the measurement beam sweeping scaling factor comprising one of a plurality of measurement beam sweeping scaling factors. Each of the plurality of measurement beam sweeping scaling factors may be associated with a given eDRX cycle length of the plurality of possible eDRX cycle lengths.

The method 1200 may further include the eDRX cycle length comprising one of a plurality of possible eDRX cycle lengths and the evaluation beam sweeping scaling factor comprising one of a plurality of evaluation beam sweeping scaling factors. Each of the plurality of evaluation beam sweeping scaling factors may be associated with a given eDRX cycle length of the plurality of possible eDRX cycle lengths.

The method 1200 may further include the eDRX cycle length comprising one of a plurality of possible eDRX cycle lengths and the detection beam sweeping scaling factor comprising one of a plurality of detection beam sweeping scaling factors. Each of the plurality of detection beam sweeping scaling factors may be associated with a given eDRX cycle length of the plurality of possible eDRX cycle lengths.

Embodiments contemplated herein include an apparatus comprising means to perform one or more elements of the methods 200 through 1200. This apparatus may be, for example, an apparatus of a UE (such as a wireless device 1402 that is a UE, as described herein).

Embodiments contemplated herein include one or more non-transitory computer-readable media comprising instructions to cause an electronic device, upon execution of the instructions by one or more processors of the electronic device, to perform one or more elements of the methods 200 through 1200. This non-transitory computer-readable media may be, for example, a memory of a UE (such as a memory 1406 of a wireless device 1402 that is a UE, as described herein).

Embodiments contemplated herein include an apparatus comprising logic, modules, or circuitry to perform one or more elements of the methods 200 through 1200. This apparatus may be, for example, an apparatus of a UE (such as a wireless device 1402 that is a UE, as described herein).

Embodiments contemplated herein include an apparatus comprising: one or more processors and one or more computer-readable media comprising instructions that, when executed by the one or more processors, cause the one or more processors to perform one or more elements of the methods 200 through 1200. This apparatus may be, for example, an apparatus of a UE (such as a wireless device 1402 that is a UE, as described herein).

Embodiments contemplated herein include a signal as described in or related to one or more elements of the methods 200 through 1200.

Embodiments contemplated herein include a computer program or computer program product comprising instructions, wherein execution of the program by a processor is to cause the processor to carry out one or more elements of the methods 200 through 1200. The processor may be a processor of a UE (such as a processor(s) 1404 of a wireless device 1402 that is a UE, as described herein). These instructions may be, for example, located in the processor and/or on a memory of the UE (such as a memory 1406 of a wireless device 1402 that is a UE, as described herein).

Figure 13:
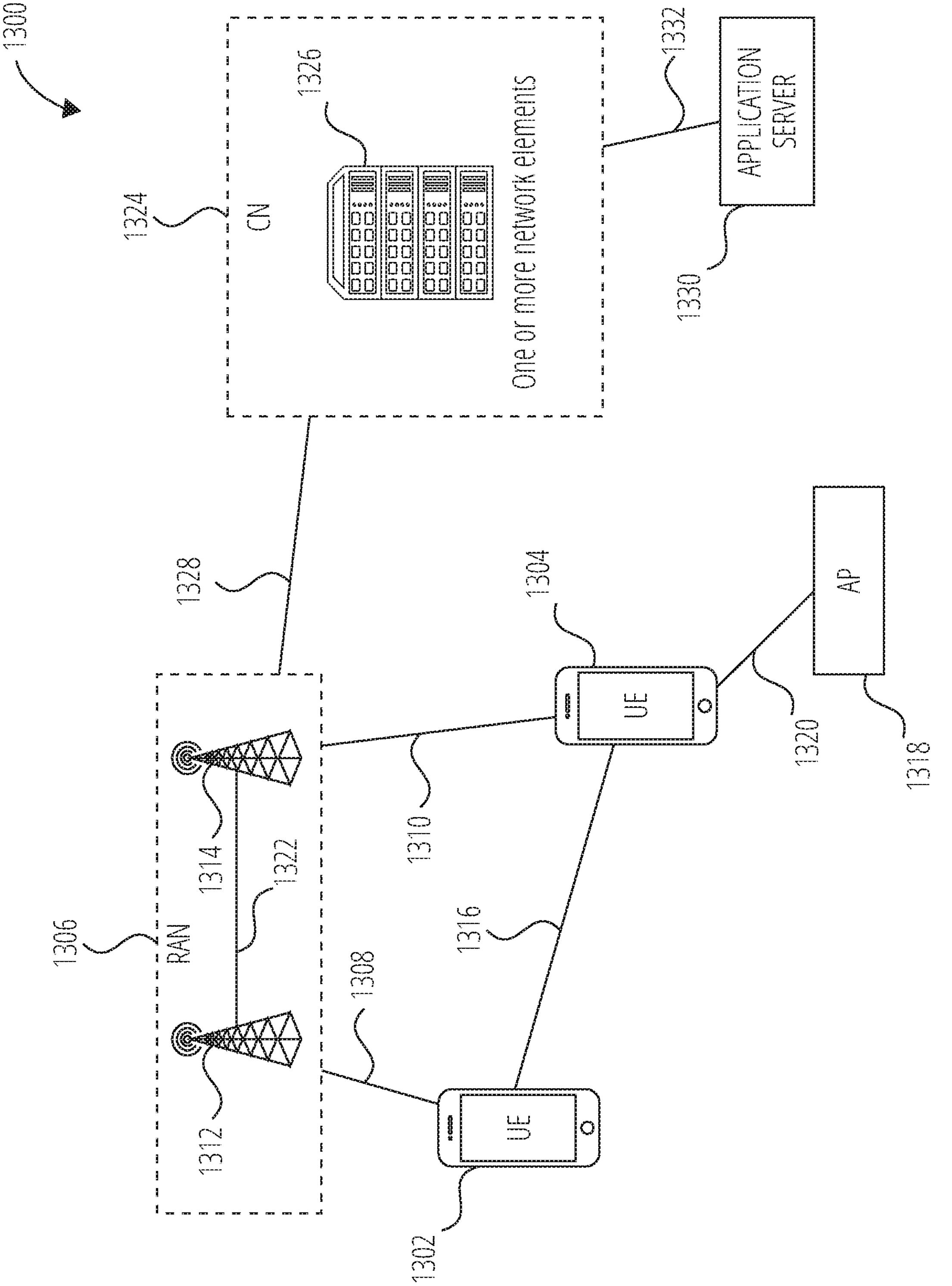
FIG. 13 illustrates an example architecture of a wireless communication system, according to embodiments disclosed herein.

FIG. 13 illustrates an example architecture of a wireless communication system 1300, according to embodiments disclosed herein. The following description is provided for an example wireless communication system 1300 that operates in conjunction with the LTE system standards and/or 5G or NR system standards as provided by 3GPP technical specifications.

As shown by FIG. 13, the wireless communication system 1300 includes UE 1302 and UE 1304 (although any number of UEs may be used). In this example, the UE 1302 and the UE 1304 are illustrated as smartphones (e.g., handheld touchscreen mobile computing devices connectable to one or more cellular networks), but may also comprise any mobile or non-mobile computing device configured for wireless communication.

The UE 1302 and UE 1304 may be configured to communicatively couple with a RAN 1306. In embodiments, the RAN 1306 may be NG-RAN, E-UTRAN, etc. The UE 1302 and UE 1304 utilize connections (or channels) (shown as connection 1308 and connection 1310, respectively) with the RAN 1306, each of which comprises a physical communications interface. The RAN 1306 can include one or more base stations, such as base station 1312 and base station 1314, that enable the connection 1308 and connection 1310.

In this example, the connection 1308 and connection 1310 are air interfaces to enable such communicative coupling, and may be consistent with RAT(s) used by the RAN 1306, such as, for example, an LTE and/or NR.

In some embodiments, the UE 1302 and UE 1304 may also directly exchange communication data via a sidelink interface 1316. The UE 1304 is shown to be configured to access an access point (shown as AP 1318) via connection 1320. By way of example, the connection 1320 can comprise a local wireless connection, such as a connection consistent with any IEEE 602.11 protocol, wherein the AP

1318 may comprise a Wi-Fi® router. In this example, the AP 1318 may be connected to another network (for example, the Internet) without going through a CN 1324.

In embodiments, the UE 1302 and UE 1304 can be configured to communicate using orthogonal frequency division multiplexing (OFDM) communication signals with each other or with the base station 1312 and/or the base station 1314 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 1312 or base station 1314 may be implemented as one or more software entities running on server computers as part of a virtual network. In addition, or in other embodiments, the base station 1312 or base station 1314 may be configured to communicate with one another via interface 1322. In embodiments where the wireless communication system 1300 is an LTE system (e.g., when the CN 1324 is an EPC), the interface 1322 may be an X2 interface. The X2 interface may be defined between two or more base stations (e.g., two or more eNBs and the like) that connect to an EPC, and/or between two eNBs connecting to the EPC. In embodiments where the wireless communication system 1300 is an NR system (e.g., when CN 1324 is a 5GC), the interface 1322 may be an Xn interface. The Xn interface is defined between two or more base stations (e.g., two or more gNBs and the like) that connect to 5GC, between a base station 1312 (e.g., a gNB) connecting to 5GC and an eNB, and/or between two eNBs connecting to 5GC (e.g., CN 1324).

The RAN 1306 is shown to be communicatively coupled to the CN 1324. The CN 1324 may comprise one or more network elements 1326, which are configured to offer various data and telecommunications services to customers/subscribers (e.g., users of UE 1302 and UE 1304) who are connected to the CN 1324 via the RAN 1306. The components of the CN 1324 may be implemented in one physical device or separate physical devices including components to read and execute instructions from a machine-readable or computer-readable medium (e.g., a non-transitory machine-readable storage medium).

In embodiments, the CN 1324 may be an EPC, and the RAN 1306 may be connected with the CN 1324 via an S1 interface 1328. In embodiments, the S1 interface 1328 may be split into two parts, an S1 user plane (S1-U) interface, which carries traffic data between the base station 1312 or base station 1314 and a serving gateway (S-GW), and the S1-MME interface, which is a signaling interface between the base station 1312 or base station 1314 and mobility management entities (MMEs).

In embodiments, the CN 1324 may be a 5GC, and the RAN 1306 may be connected with the CN 1324 via an NG interface 1328. In embodiments, the NG interface 1328 may be split into two parts, an NG user plane (NG-U) interface, which carries traffic data between the base station 1312 or base station 1314 and a user plane function (UPF), and the S1 control plane (NG-C) interface, which is a signaling interface between the base station 1312 or base station 1314 and access and mobility management functions (AMFs).

Generally, an application server 1330 may be an element offering applications that use internet protocol (IP) bearer resources with the CN 1324 (e.g., packet switched data services). The application server 1330 can also be configured to support one or more communication services (e.g., VoIP sessions, group communication sessions, etc.) for the UE 1302 and UE 1304 via the CN 1324. The application server 1330 may communicate with the CN 1324 through an IP communications interface 1332.

Figure 14:
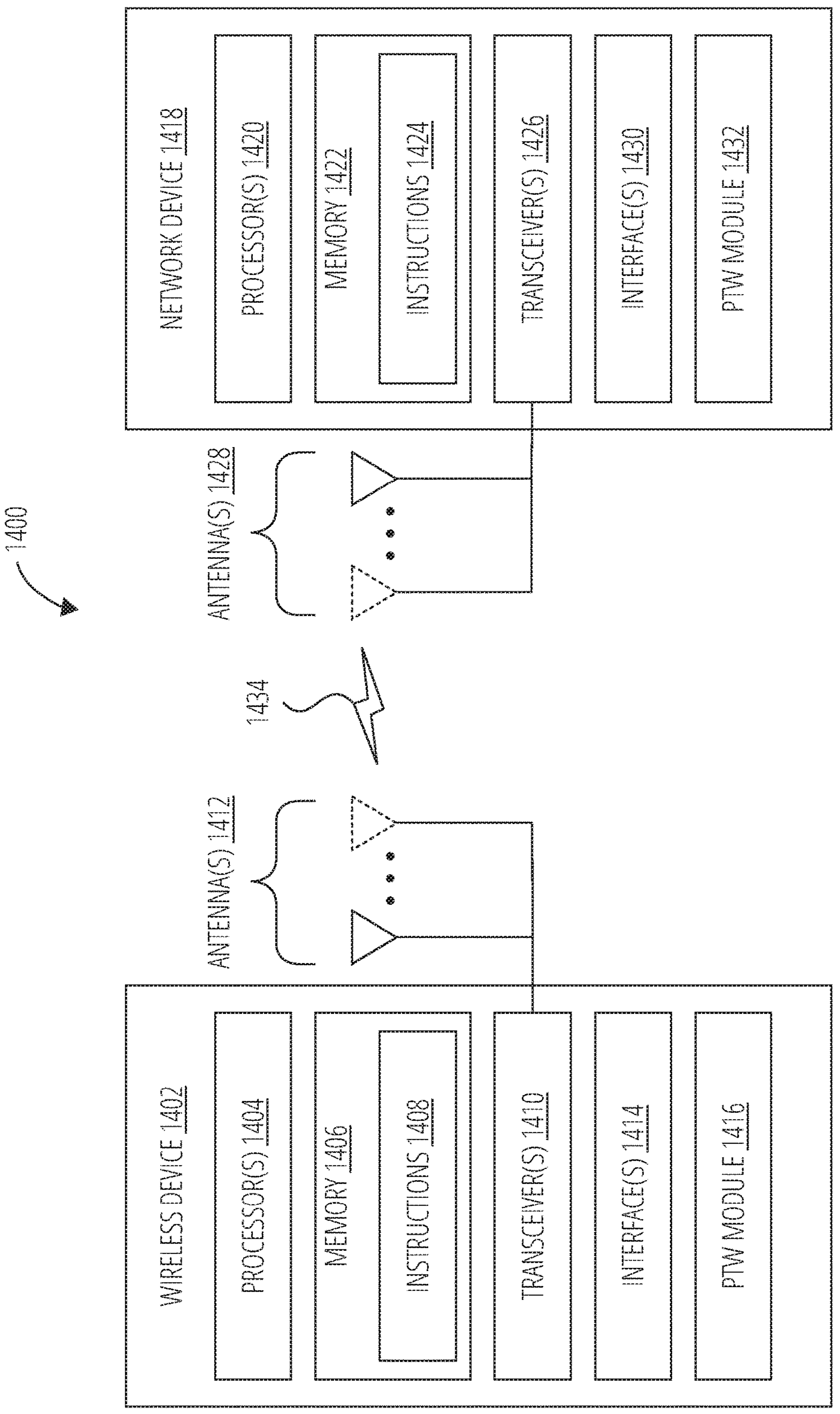
FIG. 14 illustrates a system for performing signaling between a wireless device and a network device, according to embodiments disclosed herein.

FIG. 14 illustrates a system 1400 for performing signaling 1434 between a wireless device 1402 and a network device 1418, according to embodiments disclosed herein. The system 1400 may be a portion of a wireless communications system as herein described. The wireless device 1402 may be, for example, a UE of a wireless communication system. The network device 1418 may be, for example, a base station (e.g., an eNB or a gNB) of a wireless communication system.

The wireless device 1402 may include one or more processor(s) 1404. The processor(s) 1404 may execute instructions such that various operations of the wireless device 1402 are performed, as described herein. The processor(s) 1404 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1402 may include a memory 1406. The memory 1406 may be a non-transitory computer-readable storage medium that stores instructions 1408 (which may include, for example, the instructions being executed by the processor(s) 1404). The instructions 1408 may also be referred to as program code or a computer program. The memory 1406 may also store data used by, and results computed by, the processor(s) 1404.

The wireless device 1402 may include one or more transceiver(s) 1410 that may include radio frequency (RF) transmitter and/or receiver circuitry that use the antenna(s) 1412 of the wireless device 1402 to facilitate signaling (e.g., the signaling 1434) to and/or from the wireless device 1402 with other devices (e.g., the network device 1418) according to corresponding RATs.

The wireless device 1402 may include one or more antenna(s) 1412 (e.g., one, two, four, or more). For embodiments with multiple antenna(s) 1412, the wireless device 1402 may leverage the spatial diversity of such multiple antenna(s) 1412 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1402 may be accomplished according to precoding (or digital beamforming) that is applied at the wireless device 1402 that multiplexes the data streams across the antenna(s) 1412 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1402 may implement analog beamforming techniques, whereby phases of the signals sent by the antenna(s) 1412 are relatively adjusted such that the (joint) transmission of the antenna(s) 1412 can be directed (this is sometimes referred to as beam steering).

The wireless device 1402 may include one or more interface(s) 1414. The interface(s) 1414 may be used to provide input to or output from the wireless device 1402. For example, a wireless device 1402 that is a UE may include interface(s) 1414 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1410/antenna(s) 1412 already described) that allow for communication between the UE and other devices and may operate according to known protocols (e.g., Wi-Fi®, Bluetooth®, and the like).

The wireless device 1402 may include a PTW module 1416. The PTW module 1416 may be implemented via hardware, software, or combinations thereof. For example, the PTW module 1416 may be implemented as a processor, circuit, and/or instructions 1408 stored in the memory 1406 and executed by the processor(s) 1404. In some examples, the PTW module 1416 may be integrated within the processor(s) 1404 and/or the transceiver(s) 1410. For example, the PTW module 1416 may be implemented by a combination of software components (e.g., executed by a DSP or a general processor) and hardware components (e.g., logic gates and circuitry) within the processor(s) 1404 or the transceiver(s) 1410.

The PTW module 1416 may be used for various aspects of the present disclosure, for example, aspects of FIGS. 1-12. The PTW module 1416 is configured to assist in implementing appropriate PTW lengths based on context.

The network device 1418 may include one or more processor(s) 1420. The processor(s) 1420 may execute instructions such that various operations of the network device 1418 are performed, as described herein. The processor(s) 1404 may include one or more baseband processors implemented using, for example, a CPU, a DSP, an ASIC, a controller, an FPGA device, another hardware device, a firmware device, or any combination thereof configured to perform the operations described herein.

The network device 1418 may include a memory 1422. The memory 1422 may be a non-transitory computer-readable storage medium that stores instructions 1424 (which may include, for example, the instructions being executed by the processor(s) 1420). The instructions 1424 may also be referred to as program code or a computer program. The memory 1422 may also store data used by, and results computed by, the processor(s) 1420.

The network device 1418 may include one or more transceiver(s) 1426 that may include RF transmitter and/or receiver circuitry that use the antenna(s) 1428 of the network device 1418 to facilitate signaling (e.g., the signaling 1434) to and/or from the network device 1418 with other devices (e.g., the wireless device 1402) according to corresponding RATs.

The network device 1418 may include one or more antenna(s) 1428 (e.g., one, two, four, or more). In embodiments having multiple antenna(s) 1428, the network device 1418 may perform MIMO, digital beamforming, analog beamforming, beam steering, etc., as has been described.

The network device 1418 may include one or more interface(s) 1430. The interface(s) 1430 may be used to provide input to or output from the network device 1418. For example, a network device 1418 that is a base station may include interface(s) 1430 made up of transmitters, receivers, and other circuitry (e.g., other than the transceiver(s) 1426/antenna(s) 1428 already described) that enables the base station to communicate with other equipment in a core network, and/or that enables the base station to communicate with external networks, computers, databases, and the like for purposes of operations, administration, and maintenance of the base station or other equipment operably connected thereto.

The network device 1418 may include a PTW module 1432. The PTW module 1432 may be implemented via hardware, software, or combinations thereof. For example, the PTW module 1432 may be implemented as a processor, circuit, and/or instructions 1424 stored in the memory 1422 and executed by the processor(s) 1420. In some examples, the PTW module 1432 may be integrated within the processor(s) 1420 and/or the transceiver(s) 1426. For example, the PTW module 1432 may be implemented by a combination of software components (e.g., executed by a DSP or a general processor) and hardware components (e.g., logic gates and circuitry) within the processor(s) 1420 or the transceiver(s) 1426.

The PTW module 1432 may be used for various aspects of the present disclosure, for example, aspects of FIGS. 1-12. The PTW module 1432 is configured to assist in implementing appropriate PTW lengths based on context.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for serving cell measurements at a reduced capability user equipment (UE) in idle mode in Frequency Range 1 (FR1), the method comprising:

identifying that an extended discontinuous reception (eDRX) cycle length associated with the reduced capability UE is longer than or equal to 20.48 seconds(s) and shorter than or equal to 10,485.76s, the eDRX cycle length including a discontinuous reception (DRX) cycle length;

determining that a measurement period associated with a serving cell of the reduced capability UE is to occur within a single paging time window (PTW) of the eDRX cycle, the measurement period including a plurality of measurement samples to be performed within the single PTW;

determining a length of the single PTW based on a product of the DRX cycle length and a sample scaling factor associated with the plurality of measurement samples, the length of the single PTW comprising a multiple of 1.28; and performing serving cell measurements during the single PTW, the serving cell measurements including each of the plurality of measurement samples associated with the measurement period.

2. The method of claim 1, wherein the plurality of measurement samples comprise an entirety of measurement samples associated with the measurement period of the serving cell.

3. The method of claim 1, wherein, when the product of the DRX cycle length and the sample scaling factor is not a factor of 1.28, determining the length of the single PTW further includes:

generating an integer by rounding up to a nearest integer that is more than a resulting value of the product divided by 1.28; and multiplying the integer by 1.28 to thereby generate the length of the single PTW.

4. The method of claim 3, wherein generating the integer includes performing a ceiling function on the resulting value of the product divided by 1.28.

5. The method of claim 1, wherein, when a synchronization signal block (SSB) based measurement timing configuration (SMTC) periodicity is greater than 20 milliseconds (ms) and the DRX cycle length is less than or equal to 0.64s, determining the length of the single PTW further includes multiplying the product of the DRX cycle length and the sample scaling factor by a scaling factor k to thereby generate a new product.

6. The method of claim 5, wherein, when the new product is not a factor of 1.28, determining the length of the single PTW further includes:

generating an integer by rounding up to a nearest integer that is more than a resulting value of the new product divided by 1.28; and multiplying the integer by 1.28 to thereby generate the length of the single PTW.

7. A non-transitory computer-readable storage medium including instructions that, when executed by one or more processors of a user equipment (UE) in idle mode in Frequency Range 1 (FR1), cause the UE to:

identify that an extended discontinuous reception (eDRX) cycle length associated with the reduced capability UE is longer than or equal to 20.48 seconds(s) and shorter than or equal to 10,485.76s, the eDRX cycle length including a discontinuous reception (DRX) cycle length;

determine that a measurement period associated with a serving cell of the reduced capability UE is to occur within a single paging time window (PTW) of the eDRX cycle, the measurement period including a plurality of measurement samples to be performed within the single PTW;

determine a length of the single PTW based on a product of the DRX cycle length and a sample scaling factor associated with the plurality of measurement samples, the length of the single PTW comprising a multiple of 1.28; and perform serving cell measurements during the single PTW, the serving cell measurements including each of the plurality of measurement samples associated with the measurement period.

8. The non-transitory computer-readable storage medium of claim 7, wherein the plurality of measurement samples comprise an entirety of measurement samples associated with the measurement period of the serving cell.

9. The non-transitory computer-readable storage medium of claim 7, wherein, when the product of the DRX cycle length and the sample scaling factor is not a factor of 1.28, determining the length of the single PTW further includes:

generating an integer by rounding up to a nearest integer that is more than a resulting value of the product divided by 1.28; and multiplying the integer by 1.28 to thereby generate the length of the single PTW.

10. The non-transitory computer-readable storage medium of claim 9, wherein generating the integer includes performing a ceiling function on the resulting value of the product divided by 1.28.

11. The non-transitory computer-readable storage medium of claim 7, wherein, when a synchronization signal block (SSB) based measurement timing configuration (SMTC) periodicity is greater than 20 milliseconds (ms) and the DRX cycle length is less than or equal to 0.64s, determining the length of the single PTW further includes multiplying the product of the DRX cycle length and the sample scaling factor by a scaling factor k to thereby generate a new product.

12. The non-transitory computer-readable storage medium of claim 11, wherein, when the new product is not a factor of 1.28, determining the length of the single PTW further includes:

generating an integer by rounding up to a nearest integer that is more than a resulting value of the new product divided by 1.28; and multiplying the integer by 1.28 to thereby generate the length of the single PTW.

13. An apparatus for a user equipment (UE) in idle mode in Frequency Range 1 (FR1), comprising:

one or more baseband processors configured to:

identify that an extended discontinuous reception (eDRX) cycle length associated with the reduced capability UE is longer than or equal to 20.48 seconds(s) and shorter than or equal to 10,485.76s, the eDRX cycle length including a discontinuous reception (DRX) cycle length;

determine that a measurement period associated with a serving cell of the reduced capability UE is to occur within a single paging time window (PTW) of the eDRX cycle, the measurement period including a plurality of measurement samples to be performed within the single PTW;

determine a length of the single PTW based on a product of the DRX cycle length and a sample scaling factor associated with the plurality of measurement samples, the length of the single PTW comprising a multiple of 1.28; and perform serving cell measurements during the single PTW, the serving cell measurements including each of the plurality of measurement samples associated with the measurement period.

14. The apparatus of claim 13, wherein the plurality of measurement samples comprise an entirety of measurement samples associated with the measurement period of the serving cell.

15. The apparatus of claim 13, wherein, when the product of the DRX cycle length and the sample scaling factor is not a factor of 1.28, determining the length of the single PTW further includes:

generating an integer by rounding up to a nearest integer that is more than a resulting value of the product divided by 1.28; and multiplying the integer by 1.28 to thereby generate the length of the single PTW.

16. The apparatus of claim 15, wherein generating the integer includes performing a ceiling function on the resulting value of the product divided by 1.28.

17. The apparatus of claim 13, wherein, when a synchronization signal block (SSB) based measurement timing configuration (SMTC) periodicity is greater than 20 milliseconds (ms) and the DRX cycle length is less than or equal to 0.64s, determining the length of the single PTW further includes multiplying the product of the DRX cycle length and the sample scaling factor by a scaling factor k to thereby generate a new product.

18. The apparatus of claim 17, wherein, when the new product is not a factor of 1.28, determining the length of the single PTW further includes:

generating an integer by rounding up to a nearest integer that is more than a resulting value of the new product divided by 1.28; and multiplying the integer by 1.28 to thereby generate the length of the single PTW.

* * * * *